United States Patent
Ten Wolde

(10) Patent No.: US 12,138,876 B2
(45) Date of Patent: Nov. 12, 2024

(54) BELT AND TREAD DRUM, ASSEMBLY AND METHOD FOR MANUFACTURING A BELT AND TREAD PACKAGE

(71) Applicant: VMI Holland B.V., Epe (NL)

(72) Inventor: Wiebe Herman Ten Wolde, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 18/024,724

(22) PCT Filed: Sep. 9, 2021

(86) PCT No.: PCT/NL2021/050546
§ 371 (c)(1),
(2) Date: Mar. 3, 2023

(87) PCT Pub. No.: WO2022/055349
PCT Pub. Date: Mar. 17, 2022

(65) Prior Publication Data
US 2023/0311439 A1    Oct. 5, 2023

(30) Foreign Application Priority Data
Sep. 11, 2020 (NL) .................. 2026457

(51) Int. Cl.
*B29D 30/26* (2006.01)
*B29D 30/24* (2006.01)
*B29D 30/28* (2006.01)

(52) U.S. Cl.
CPC .......... *B29D 30/26* (2013.01); *B29D 30/242* (2013.01); *B29D 2030/2671* (2013.01); *B29D 2030/2685* (2013.01); *B29D 30/28* (2013.01)

(58) Field of Classification Search
CPC .......... B29D 30/242; B29D 2030/2671; B29D 2030/549; B29D 2030/4487; B29D 2030/2685
See application file for complete search history.

(56) References Cited

U.S. PATENT DOCUMENTS

| 2,988,131 A | 6/1961 | Frochlich et al. ............. 154/9 |
| 6,105,648 A | 8/2000 | De Graaf et al. ..... B29D 30/28 |
(Continued)

FOREIGN PATENT DOCUMENTS

| DE | 102007031091 | 1/2009 | ............ B29D 30/26 |
| EP | 2646232 A1 * | 10/2013 | .......... B29D 30/005 |
(Continued)

OTHER PUBLICATIONS

Guy. WO2020008069. Published Jan. 9, 2020. Machine Translation by ESpaceNet. (Year: 2023).*
(Continued)

*Primary Examiner* — Katelyn W Smith
*Assistant Examiner* — Alexander D Booth
(74) *Attorney, Agent, or Firm* — HAYES SOLOWAY P.C.

(57) ABSTRACT

The invention relates to a belt and tread drum (1, 401, 501, 601), an assembly of the belt and tread drum and a pressing device and to a method for manufacturing a belt and tread package (9), wherein the belt and tread drum comprises a first support member (2), wherein the first support member (2) comprises a tread support surface (20) which faces away from the drum axis (x) for supporting the tread layer (92) where said tread layer (92) is wider than the belt layer (91), wherein the first support member (2) is positionable in a raised position outside the circumferential surface (S) in the radial direction, wherein the belt and tread drum (1, 401, 501, 601) further comprises a first retaining element (4, 404) and a second retaining element for retaining the tread layer (92) at the first support member.

34 Claims, 19 Drawing Sheets

(56) References Cited

U.S. PATENT DOCUMENTS

| | | | |
|---|---|---|---|
| 10,744,731 B2 | 8/2020 | Takai | B29D 30/242 |
| 11,298,900 B2 | 4/2022 | Lo Presti et al. | B29D 30/36 |
| 11,390,048 B2 | 7/2022 | De Graaf et al. | B29D 30/26 |
| 11,426,961 B2 | 8/2022 | Kaagman et al. | B29D 30/28 |
| 11,712,862 B2 | 8/2023 | Dijkstra et al. | B29D 30/24 |
| 2016/0151990 A1* | 6/2016 | Dijkstra | B29D 30/58 |
| | | | 156/414 |

FOREIGN PATENT DOCUMENTS

| | | | | |
|---|---|---|---|---|
| GB | 1563342 | 3/1980 | | B29D 17/16 |
| JP | 2001198991 | 7/2001 | | B29D 30/58 |
| JP | 3742111 | 11/2005 | | B29D 30/26 |
| JP | 2019503899 | 2/2019 | | B29D 30/20 |
| JP | 2020518483 | 6/2020 | | B29D 30/26 |
| KR | 1020160042907 | 4/2016 | | B29D 30/24 |
| KR | 1020200104286 | 9/2020 | | B29D 30/20 |
| WO | 9818613 | 5/1998 | | B29D 30/28 |
| WO | 2015023183 | 2/2015 | | B29D 30/24 |
| WO | 2019182439 | 9/2019 | | B29D 30/28 |
| WO | WO-2020008069 A1 * | 1/2020 | | B25J 15/0071 |

OTHER PUBLICATIONS

Korean Decision to Grant issued in related application serial No. 10-2023-7012188, dated Oct. 30, 2023, with translation, 5 pages.
Official Action issued in Japanese Patent Appln. Serial No. 2022-519677, dated Apr. 18, 2023, 4 pages.
International Search Report and Written Opinion issued in PCT/NL2021/050546, dated Mar. 15, 2022, 18 pages.
International Preliminary Report on Patentability issued in PCT/NL2021/050546, dated Mar. 7, 2023, 12 pages.
Search Report issued in Netherlands Patent Appln. Serial No. 2026457, dated Apr. 27, 2021, 9 pages.
Japanese Decision to Grant issued in related application serial No. 2022-519677, dated May 17, 2023, with translation, 4 pages.

* cited by examiner

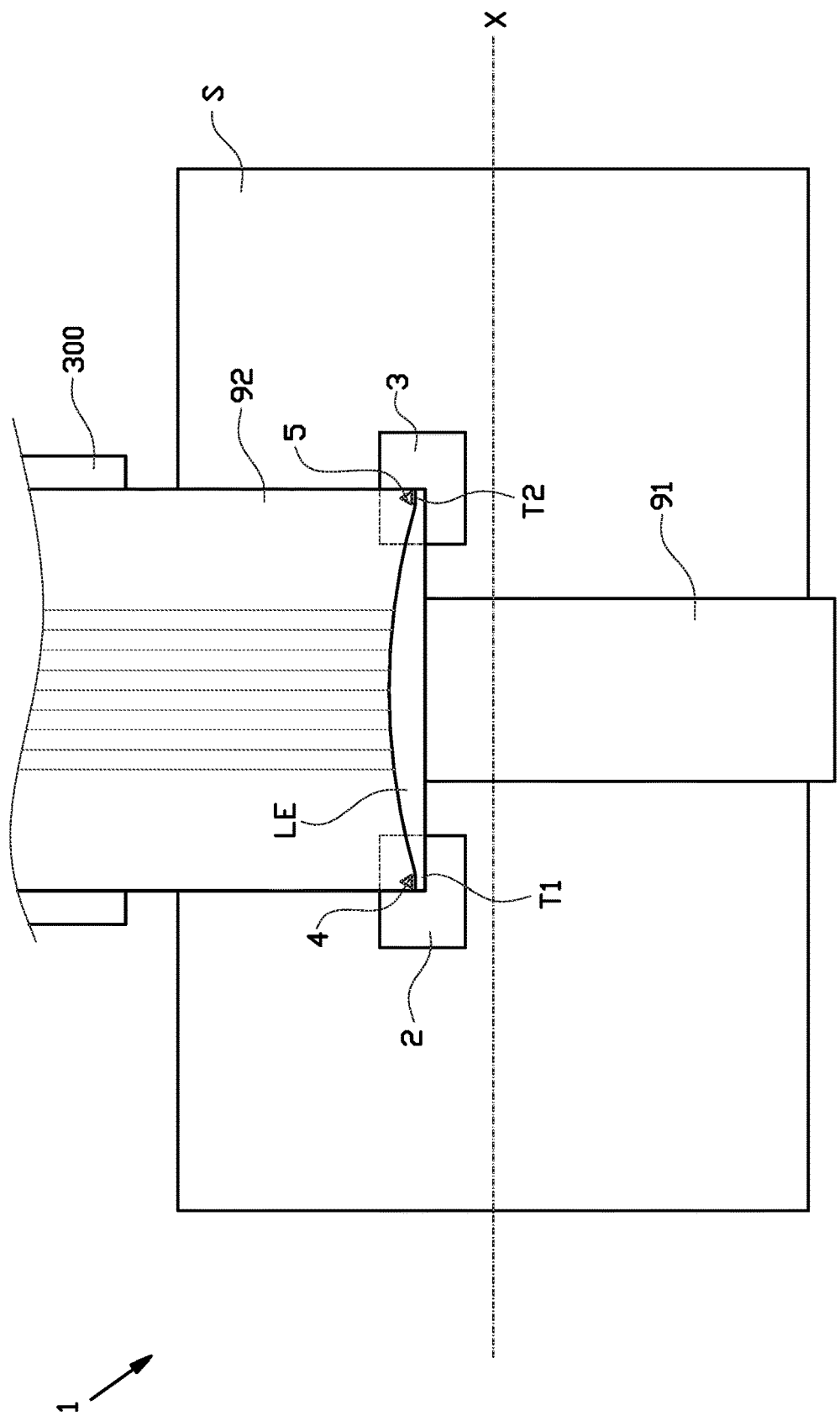

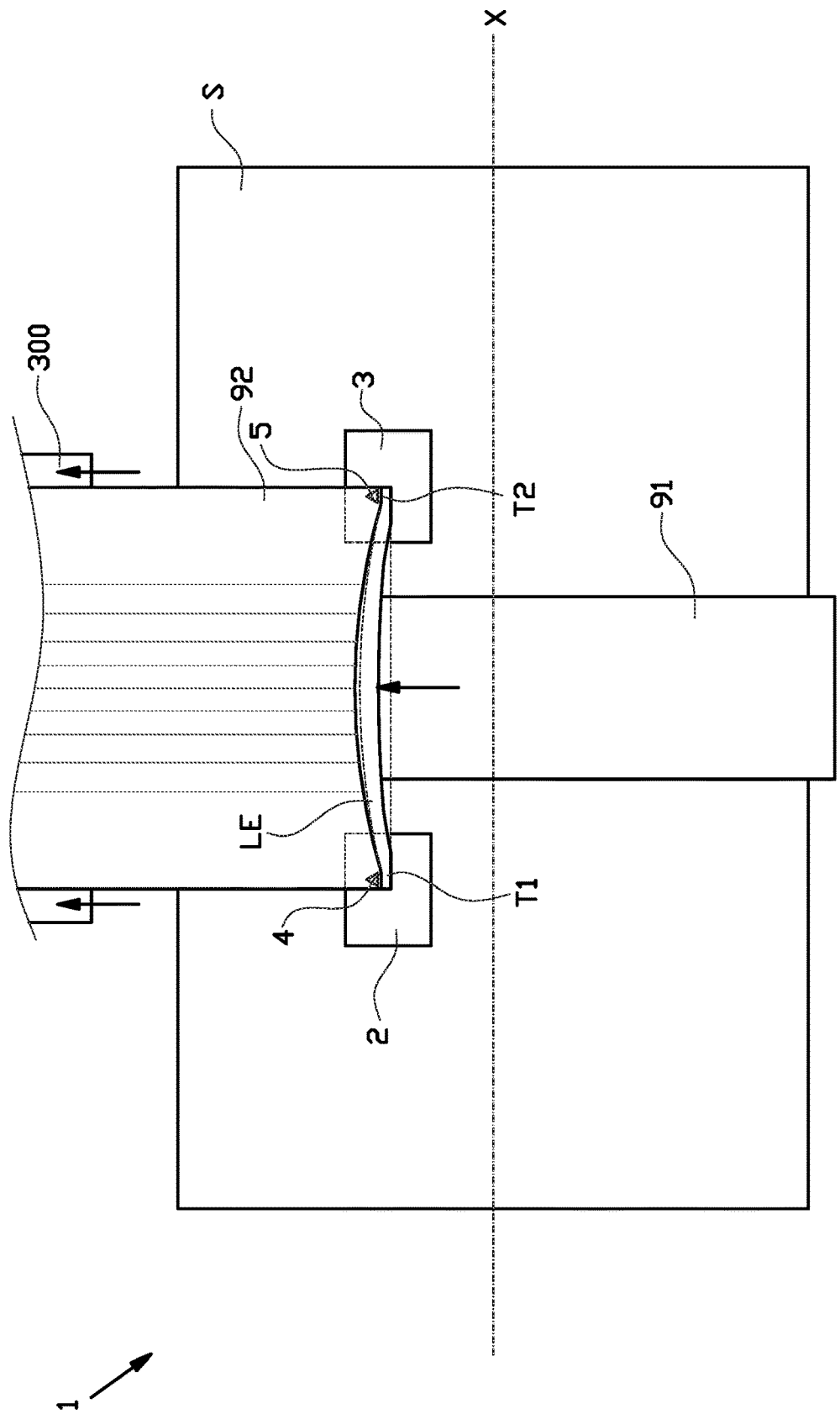

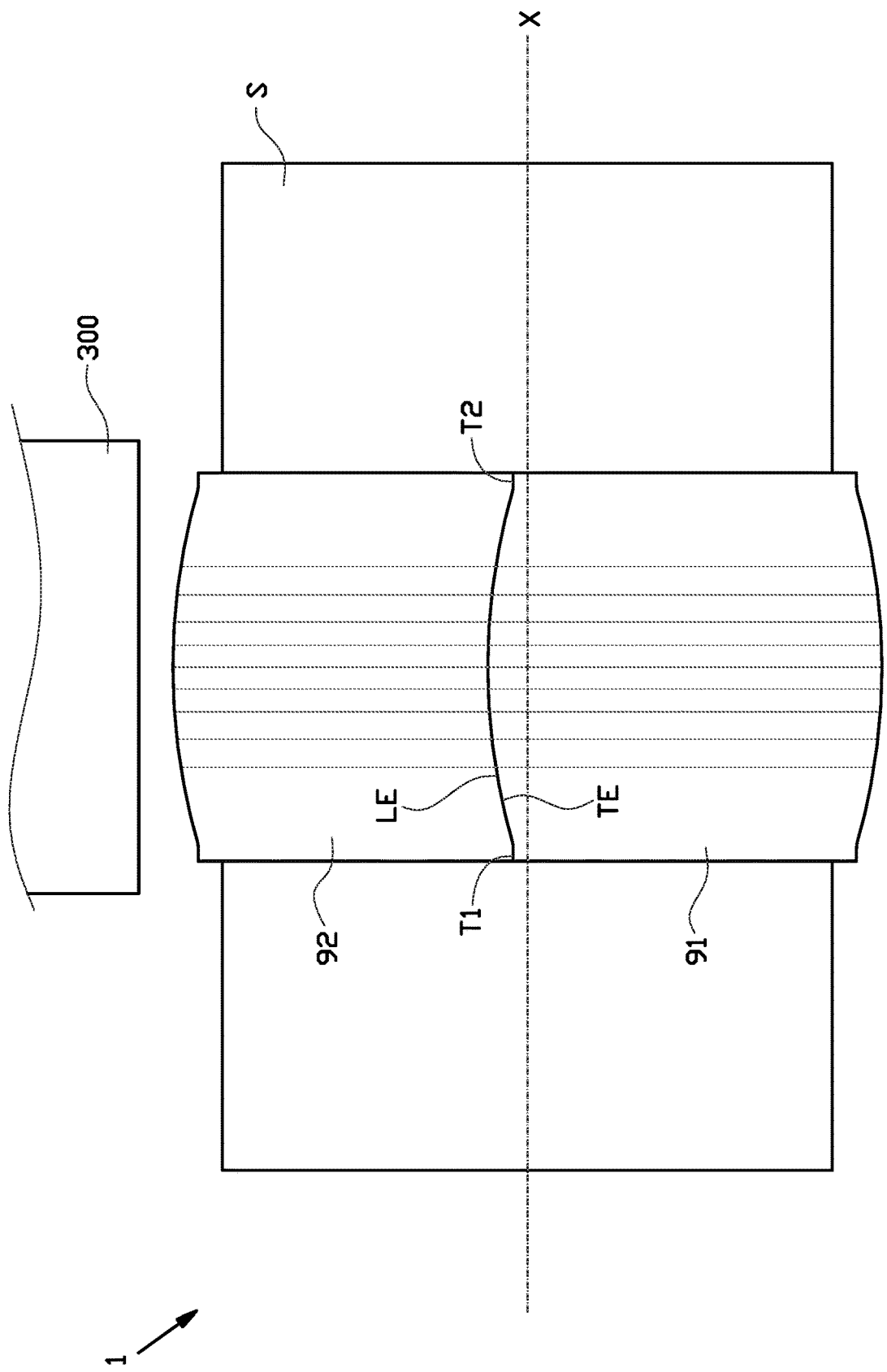

BELT AND TREAD DRUM, ASSEMBLY AND METHOD FOR MANUFACTURING A BELT AND TREAD PACKAGE

BACKGROUND

The invention relates to a belt and tread drum, assembly and a method for manufacturing a belt and tread package. The invention further relates to a drum for tire building, such as a belt and tread drum or a transfer drum, and a method of operating said drum.

WO 2015/023183 A1 discloses a belt and tread drum for manufacturing a package of a belt layer and a tread layer into a substantially cylindrical tire component. The building drum comprises two support members which are radially movable to support the sides of a tread layer when said tread layer is wider than the belt layers underneath, in particular in the area where the leading end and the trailing end of said tread layer overlap and need to be stitched reliably.

SUMMARY OF THE INVENTION

A disadvantage of the known building drum is that the tread layer is not fixated on the support members in the overlap area. Hence, although the tread layer is uniformly supported across its entire width, the tread layer may still shift or slide over the support members prior to the stitching. Moreover, the tips or wings at the leading end of the tread layer tend to deform or contract slightly after the tread layer has been manufactured, thereby causing indentations at said wing positions when the tread layer is applied to the building drum. This may affect the ability to accurately splice the trailing end to the leading end.

It is an object of the present invention to provide a belt and tread drum, assembly and a method for manufacturing a belt and tread package, wherein the positioning of the tread layer on the support member prior to stitching can be further improved.

According to a first aspect, the invention provides a belt and tread drum for manufacturing a belt and tread package, wherein the belt and tread package comprises a belt layer and a tread layer that is wider than the belt layer, wherein the belt and tread drum has a circumferential surface that is rotatable about a drum axis, wherein the belt and tread drum comprises a first support member, wherein the first support member comprises a tread support surface which faces away from the drum axis for at least partially supporting the tread layer where said tread layer is wider than the belt layer, wherein the first support member is positionable in a raised position outside the circumferential surface in the radial direction, wherein the belt and tread drum further comprises a first retaining element for engaging onto the tread layer to retain the tread layer in position on the tread support surface at the first support member.

The first retaining element is a part of the belt and tread drum that is functionally different from the tread support surface in that the tread support surface merely supports the tread layer and in that the first retaining element retains the tread layer in position on said tread support surface.

The retaining element can effectively retain the tread layer in position on the tread support surface, i.e. by preventing sliding or shifting of said tread layer relative to the tread support surface. Hence, the positioning of the tread layer on the support member prior to stitching can be improved. More in particular, the tips or wings at the leading end of the tread layer can be retained more reliably, thereby keeping said tips or wings in an optimal position when splicing the trailing end to the leading end.

In a preferred embodiment the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the second support member is positionable in a raised position outside the circumferential surface in the radial direction, wherein the belt and tread drum further comprises a second retaining element for retaining the tread layer at the second support member. By providing two retaining elements, both tips or wings can be retained simultaneously or in a certain sequence.

In one embodiment the first retaining element and the second retaining element are individually movable. Additionally or alternatively, the first retaining element and the second retaining element are asynchronously controllable. In the context of the present invention, the term 'asynchronously' is to be interpreted as not occurring at the same time or in the same manner. The aforementioned features can be used to move the retaining elements over different distances or at different times. For example, one may choose to initially retain the tread layer at one of the support members only to use the fact that the tread layer can still shift or slide over the other support member to advantageously correct deformations in the tread layer, i.e. by rotating the belt and tread drum and/or pulling back on the tread layer by reversing the conveyor that supplies the tread layer to the belt and tread drum, thereby pulling along one side of the tread layer more than the other side of the tread layer.

In another embodiment the first retaining element comprises one or more needles. A needle can at least partially protrude from the tread support surface and/or pierce into the material of the tread layer to effectively retain the tread layer in position on the respective support member. Additionally or alternatively, a suction element or another suitable type of retaining element may be used.

In another embodiment the first support member is provided with a hole in the tread support surface of the first support member, wherein the first retaining element is movable with respect to the first support member through the hole in the tread support surface of the first support member. The hole can conveniently be located within the boundaries of the tread support surface and thereby engage and/or interact with the tread layer directly from within said boundaries.

In another embodiment the first retaining element is movable with respect to the first support member in a direction transverse or substantially transverse to the drum axis, i.e. in a radial direction. The retaining elements can thus be moved in the same or substantially the same direction as the support members.

In another embodiment the belt and tread drum comprises a first drive member for driving the movement of the first support member and the first retaining element in the radial direction. The first support member and the first retaining element can thus be driven by the same first drive member. Consequently, no separate drive member is required for the driving of the first retaining element. Similarly, the second support member and the second retaining element can be driven by the same second drive member with the same technical advantage.

Preferably, the first drive member is a linear drive that is movable along a stroke distance, wherein the first drive member, along a first part of the stroke distance, is arranged to drive only the first retaining element in the radial direction and wherein the first drive member, along a second part of the stroke distance, is arranged to drive both the first retaining element and the first support member in the radial direction. Hence, the first retaining element can be made to move relative to the first support member that is initially kept stationary. Once the first retaining element and the first support member are both moved, the relative movement between the first retaining element and the first member can be reduced or eliminated. In other words, once the first retaining element and the first support member are both moved in the radial direction, they can be moved in unison.

More preferably, the first drive member comprises a retaining pusher and a support pusher, wherein the retaining pusher is arranged to push or contact the first retaining element or a part associated with said first retaining element in the radial direction before the support pusher pushes or contacts the first support member or a part associated with said first support member. The first drive member can therefore be driven continuously in the radial direction in a linear manner while taking along the first retaining element with the retaining pusher during the first part of the stroke distance and the first support member with the support pusher during the second part of the stroke distance.

Most preferably, the first support member comprises a base with a contact surface extending at an oblique angle to the radial direction for contacting the support pusher, wherein the support pusher is movable with respect to said contact surface in an adjustment direction transverse or perpendicular to the radial direction to adjust the first part and the second part of the stroke distance. By adjusting the first part of the stroke distance, the amount of relative movement between the first retaining element and the first support member can be set. In particular, the support pusher can be made to contact the first support member after a longer first part of the stroke distance to allow for the first retaining element to protrude further from the support member. Conversely, the support pusher can be made to contact the first support member after a shorter first part of the stroke distance to allow for the first retaining element to protrude less from the support member. In the case of the first retaining element comprising one or more needles, the adjustment can set the depth over which the one or more needles pierce into the material of the tread layer.

In a further embodiment, the retaining pusher is a pneumatic actuator comprising a cylinder, a first flow channel in fluid communication with said cylinder at a first end of the cylinder and a second flow channel in fluid communication with the cylinder at a second end of the cylinder opposite to the first end of the cylinder, wherein the retaining pusher further comprises a piston which is movable back and forth within the cylinder between a first position at the first end of the cylinder and a second position at the second end of the cylinder. A pneumatic actuator can reliably displace the retaining element in the radial direction.

In a further embodiment thereof, the piston comprises a piston aperture extending through said piston, wherein the retaining pusher is arranged to allow a fluid to flow between the first flow channel and the second flow channel when the piston is in the first position or between the first position and the second position, and wherein the retaining pusher is arranged to block a fluid flow between the first flow channel and the second flow channel when the piston is in the second position. Hence, by measuring a fluid flow at the first and/or second flow channel, it can be reliably determined whether the piston is in the second position.

In a preferred embodiment thereof, the belt and tread drum further comprises a control unit having a flow meter which is in fluid communication with the first flow channel for measuring a flow in said first flow channel. When measuring the flow at the second flow channel, small leakages between the piston and the cylinder may be recorded as a fluid flow. This problem can be prevented when measuring at the first flow channel. Hence, the fluid flow can be measured more reliably. The control unit can generate signals indicative of the measured flow. Preferably, the control unit is further functionally coupled to an fluid supply and/or to a rotational drive of the belt and tread drum.

In a further embodiment thereof, the control unit is arranged to generate a signal indicative of the piston not being in the second position, when said piston is moved towards the second position and a flow is measured by the flow meter; and/or wherein the control unit is arranged to generate a signal indicative of the piston being in the second position when said piston has been moved into the second position and no flow is measured by the flow meter. In other words, when a flow is detected by the flow meter, the control unit can communicate that the piston is not in the second position. Additionally or alternatively, when no flow is detected, the control unit can communicate that the piston is in the second position. Hence, the control unit can reliably determine whether the piston is in the second position and, thus, whether the retaining element is in its retracted position. Accordingly, the control unit can be arranged to block a rotation of the belt and tread drum when the retaining element is not in its retracted position. Consequently, a rotation of the drum with extended or partially extended retaining elements can be prevented. Hence, process safety can be improved. Additionally, damaging of tire components present on the belt and tread drum can be prevented.

In a further embodiment, the control unit is arranged to generate a signal indicative of a normal functioning of the retaining pusher when the piston is moved into the first position and a flow is measured by the flow meter; and/or wherein the control unit is arranged to generate a signal indicative of a contamination of the piston aperture when the piston is moved into the first position and no flow is measured by the flow meter. In other words, the control unit can detect a contamination or a clogging up of the piston aperture. Preferably, the control unit is arranged to block a rotation of the belt and tread drum to allow a cleaning of the piston aperture. Hence, a malfunction of the retaining pusher can be detected early on. Thus, working safety can be further improved.

In a further embodiment, the retaining pusher comprises a spacer for, when the piston is in the first position, spacing apart the piston and the first end of the cylinder such that the first flow channel and the piston aperture are in fluid communication. In other words, the spacer can enable a flow between the first channel and the piston aperture when the piston is in the first position. Hence, the spacer can allow a flow between the first channel and the second channel via said piston aperture when the piston is in the first position.

In a preferred embodiment thereof, the spacer is arranged on the piston. The spacer may for example be a spacer ring arranged around a stem that is connected to the piston.

In an alternative embodiment thereof, the spacer is arranged at the first end of the cylinder.

In a further embodiment, the first flow channel is arranged to be in line with the piston aperture when the piston is in the first position. When the first flow channel is in line with the piston aperture, a fluid can freely flow from the first channel to the second channel via the piston aperture, without the need of a spacer.

In another embodiment the belt and tread drum comprises a plurality of radially movable segments that together form the circumferential surface, wherein the first support member and the first retaining element are provided at one radially movable segment of the plurality of radially movable segments. The one radially movable segment may be arranged in a predetermined position around the circumferential surface of the tread and belt drum that is designated to receive the leading end and the trailing end of the tread layer in an overlapping configuration for stitching and/or splicing.

Preferably, the first support member is movable in the radial direction between a retracted position and a raised position relative to said one radially movable segment. In other words, the plurality of radially movable segments can be moved in the radial direction to expand or contract the diameter of the belt and tread drum as a whole, while the support members can be moved relative to the one radially movable segment in which they are located, regardless of the radial position of said one radially movable segment. Moreover, in line with the previously discussed embodiments, the retaining elements can be moved relative to the support members, which can be moved relative to the radially movable segments.

In another embodiment the one or more needles of the first retaining element are tiltable about a tilt axis transverse to the radial direction when said one or more needles partially protrude outside the first support member in the radial direction. This can increase the grip of the needle on the material of the tread layer and may prevent accidental or unintentional release of the tread layer from said needle.

According to a second aspect, the invention provides a drum for tire building, such as a belt and tread drum or a transfer drum, comprising a pneumatic actuator for controlling a radial movement of an actuated drum part with respect to a reference surface of said drum, wherein the pneumatic actuator comprises a cylinder with a first flow channel at a first end of the cylinder and a second flow channel at a second end of the cylinder opposite to the first end of the cylinder, wherein the retaining pusher further comprises a piston which is movable back and forth within the cylinder between a first position at the first end of the cylinder and a second position at the second end of the cylinder, wherein the piston comprises a piston aperture extending through said piston, wherein the pneumatic actuator is arranged to allow a fluid to flow between the first flow channel and the second flow channel when the piston is in the first position or between the first position and the second position, and wherein the pneumatic actuator is arranged to block a fluid flow between the first flow channel and the second flow channel when the piston is in the second position.

Hence, by measuring a fluid flow at the first and/or second flow channel, it can be reliably determined whether the piston is in the second position.

In an embodiment thereof, the drum further comprises a control unit having a flow meter which is in fluid communication with the first flow channel for measuring a flow in said first flow channel. When measuring the flow at the second flow channel, small leakages between the piston and the cylinder may be recorded as a fluid flow. This problem can be prevented when measuring at the first flow channel. Hence, the fluid flow can be measured more reliably. The control unit can generate signals indicative of the measured flow. Preferably, the control unit is further functionally coupled to an fluid supply and/or to a rotational drive of the belt and tread drum.

In a further embodiment thereof, the control unit is arranged to generate a signal indicative of the piston not being in the second position, when said piston is moved towards the second position and a flow is measured by the flow meter; and/or wherein the control unit is arranged to generate a signal indicative of the piston being in the second position when said piston has been moved into the second position and no flow is measured by the flow meter. In other words, when a flow is detected by the flow meter, the control unit can communicate that the piston is not in the second position. Additionally or alternatively, when no flow is detected, the control unit can communicate that the piston is in the second position. Hence, the control unit can reliably determine whether the piston is in the second position and, thus, whether the retaining element is in its retracted position. Accordingly, the control unit can be arranged to block a rotation of the belt and tread drum when the retaining element is not in its retracted position. Consequently, a rotation of the drum with extended or partially extended retaining elements can be prevented. Hence, process safety can be improved. Additionally, damaging of tire components present on the belt and tread drum can be prevented.

In a further embodiment, the control unit is arranged to generate a signal indicative of a normal functioning of the pneumatic actuator when the piston is moved into the first position and a flow is measured by the flow meter; and/or wherein the control unit is arranged to generate a signal indicative of a contamination of the piston aperture when the piston is moved into the first position and no flow is measured by the flow meter. In other words, the control unit can detect a contamination or a clogging up of the piston aperture. Preferably, the control unit is arranged to block a rotation of the belt and tread drum to allow a cleaning of the piston aperture. Hence, a malfunction of the retaining pusher can be detected early on. Thus, working safety can be further improved.

In a further embodiment, the pneumatic actuator comprises a spacer for, when the piston is in the first position, spacing apart the piston and the first end of the cylinder such that the first flow channel and the piston aperture are in fluid communication. In other words, the spacer can enable a flow between the first channel and the piston aperture when the piston is in the first position. Hence, the spacer can allow a flow between the first channel and the second channel via said piston aperture when the piston is in the first position.

In a preferred embodiment thereof, the spacer is arranged on the piston. The spacer may for example be a spacer ring arranged around a stem that is connected to the piston.

In an alternative embodiment thereof, the spacer is arranged at the first end of the cylinder.

In a further embodiment, the first flow channel is arranged to be in line with the piston aperture when the piston is in the first position. When the first flow channel is in line with the piston aperture, a fluid can freely flow from the first channel to the second channel via the piston aperture, without the need of a spacer.

According to a third aspect the invention provides an assembly of a belt and tread drum according to any one of the aforementioned embodiments of the first aspect of the invention and a pressing member for applying pressure to the tread layer.

The pressing member can effectively cooperate with the aforementioned retaining elements of the belt and tread drum to reliably retain the tread layer. In particular, the pressing member can provide counter pressure to the tread layer when the retaining element engage onto and/or pierce into the tread layer from the other side.

Preferably, the pressing member is arranged for applying pressure to the tread layer asymmetrically across the width of the tread layer. Hence, the pressing member can apply pressure selectively or non-uniformly, depending on where the pressure is required. In particular, the pressure can be applied only where the tread layer needs to be retained, as illustrated in the embodiment below.

In a further embodiment the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the pressing member comprises a plurality of discs and a shaft for supporting said plurality of discs in a side-by-side configuration, wherein each disc of the plurality of discs is individually movable with respect to the other discs of the plurality of discs in a pressing direction perpendicular to the shaft, wherein plurality of discs comprises a first group of discs for pressing an area of the tread layer that is supported on the first support member and a second group of discs for pressing an area of the tread layer that is supported on the second support member, wherein the movement of the discs of the first group is controllable independently of the movement of the discs of the second group. Consequently, when the tread layer is being retained by only one of the retaining elements, the pressure can be applied only to the part of the tread layer that is being held by said one retaining element, whereas the part of the tread layer that is still unretained, i.e. at the other retaining element. In this way, the unretained part of the tread layer can still shift freely over the respective support member, i.e. to reposition or deform said unretained part with respect to the retained part of the tread layer. In this way, the shape of the tread layer, and in particular the leading end thereof, can be optimized for splicing.

According to a fourth aspect, the invention provides a method for manufacturing a belt and tread package with the use of the belt and tread drum according to any one of the embodiments of the first aspect of the invention, wherein the method comprises the steps of:
applying the belt layer around the circumferential surface of the belt and tread drum;
applying the tread layer around the belt layer while supporting the tread layer with the first support member where said tread layer is wider than the belt layer; and
retaining the tread layer at the first support member with the first retaining element.

The aforementioned method relates to the practical use of the belt and tread drum according to the first aspect of the invention and thus has the same technical advantages, which will not be repeated hereafter.

In a preferred embodiment the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the second support member is positionable in a raised position outside the circumferential surface in the radial direction, wherein the belt and tread drum further comprises a second retaining element for retaining the tread layer at the second support member, wherein the method comprises the steps of:
applying the belt layer around the circumferential surface of the belt and tread drum between the first support member and the second support member;
applying the tread layer around the belt layer while supporting the tread layer with the second support member where said tread layer is wider than the belt layer; and
retaining the tread layer at the second support member with the second retaining element.

In one embodiment, the first retaining element and the second retaining element are controlled to retain the tread layer simultaneously.

Alternatively, the first retaining element and the second retaining element are controlled to retain the tread layer asynchronously.

In another embodiment the first retaining element comprises one or more needles, wherein the retaining of the tread layer by the first retaining element involves piercing the one or more needles into the tread layer.

Preferably, the one or more needles of the first retaining element are tilted about a tilt axis transverse to the radial direction when said one or more needles partially protrude outside the first support member in the radial direction. In another embodiment the method further comprises the steps of moving only the first retaining element in the radial direction along a first part of a stroke distance and moving both the first retaining element and the first support member in the radial direction along a second part of the stroke distance.

Preferably, the method further comprises the step of adjusting the first part and the second part of the stroke distance.

In another embodiment the belt and tread drum comprises a plurality of radially movable segments that together form the circumferential surface, wherein the first support member and the first retaining element are provided at one radially movable segment of the plurality of radially movable segments, wherein the method further comprises the step of moving the first support member in the radial direction between a retracted position and a raised position relative to said one radially movable segment.

In another embodiment the method further comprises the steps of supplying the tread layer to the belt and tread drum with a servicer and pulling back on the tread layer with the servicer when the tread layer is retained by the first retaining element. Preferably, the servicer pulls back on the tread layer when the tread layer is retained by both the first retaining element and the second retaining element. By pulling back on the tread layer, i.e. in a direction opposite to its feeding direction, the tread layer can be deformed with respect to the part(s) of said tread layer that is/are retained. Hence, the shape of the tread layer, and in particular the leading end thereof, can be optimized for splicing.

In another embodiment the tread layer has a leading end, wherein the first retaining element and the second retaining element retain a first tip and a second tip, respectively, of the tread layer at the leading end. As mentioned before, the tips or wings of the tread layer tend to deform or contract slightly, thereby causing indentations in the splice between the trailing end and the leading end at the locations of said tips or wings. By retaining the tips, their position relative to each other and/or the rest of the leading end can be controlled and/or adjusted. In particular, the tips can be retained while the rest of the leading end is pulled back by the previously mentioned servicer to make sure that the tips protrude slightly more forward than the rest of the leading end, i.e. to ensure a good, tightly pressed splice between the trailing end and the leading end at the positions of said tips.

In a further embodiment, the tread layer has a leading end, wherein the first retaining element and the second retaining element retain the tread layer at the leading end while applying said tread layer around the belt layer. Hence, the leading end can be reliably retained during the application thereof. Thus, said leading end can be positioned more precisely. Consequently, the leading end and the trailing end of the tread layer can be spliced more reliably.

In another embodiment the method further comprises the step of using a pressing member to apply pressure to the tread layer.

Preferably, the pressing member applies pressure to the tread layer asymmetrically across the width of the tread layer.

In another embodiment the method further comprises the step of using a pressing member to apply pressure to the tread layer, wherein the pressing member comprises a plurality of discs and a shaft for supporting said plurality of discs in a side-by-side configuration, wherein each disc of the plurality of discs is individually movable with respect to the other discs of the plurality of discs in a pressing direction perpendicular to the shaft, wherein the method further comprises the step of pressing an area of the tread layer that is supported on the first support member with a first group of discs of the plurality of discs and pressing an area of the tread layer that is supported on the second support member with a second group of discs of the plurality of discs by controlling the movement of the discs of the first group independently of the movement of the discs of the second group.

Preferably, the discs of the first group are pressed onto the tread layer when the first retaining element retains the tread layer.

In a further embodiment the discs of the second group are pressed onto the tread layer when the second retaining element retains the tread layer.

According to a fifth aspect, the invention provides a method for operating a drum for tire building according to any one of the embodiments according to the second aspect of the invention, wherein the method comprises providing a working fluid, preferably air, at a first pressure at the first flow channel and providing said working fluid at a second pressure at the second flow channel, wherein the method comprises the steps of:
a) increasing the first pressure relative to the second pressure to move the piston towards the second position;
b) rotating the drum; and
c) increasing the second pressure relative to the first pressure to move the piston towards the first position.

The actuator of the drum for tire building can be reliably operated by applying a pressure difference over the first flow channel and the second flow channel.

In an embodiment thereof, the method further comprises measuring a fluid flow at the first flow channel. Hence, the presence of the piston in the second position can be determined by measuring the presence of a fluid flow. Alternatively, or additionally a normal functioning or contamination of the actuator can be determined.

In a preferred embodiment thereof, the method further comprises:
blocking the rotation of step b) when a flow is measured during step a); and/or
initiating the rotation of step b) when no flow is measured during step a). Thus, a rotation of the drum can be prevented when the piston is not in the second position. Hence, working safety can be enhanced. Additionally, a rotation of the drum can be automatically initiated upon detecting the presence of the piston in the second position. Thus, the process efficiency can be improved.

In a further embodiment, the method further comprises checking the piston aperture for contaminations when no flow is measured during step c). By measuring the flow during step c) a contamination of the piston aperture or malfunction of the actuator can be detected.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 7A, 7B and 7C show top views of the belt and tread drum during steps of a method for manufacturing a belt and tread package;

DETAILED DESCRIPTION OF THE INVENTION

Figure 1:
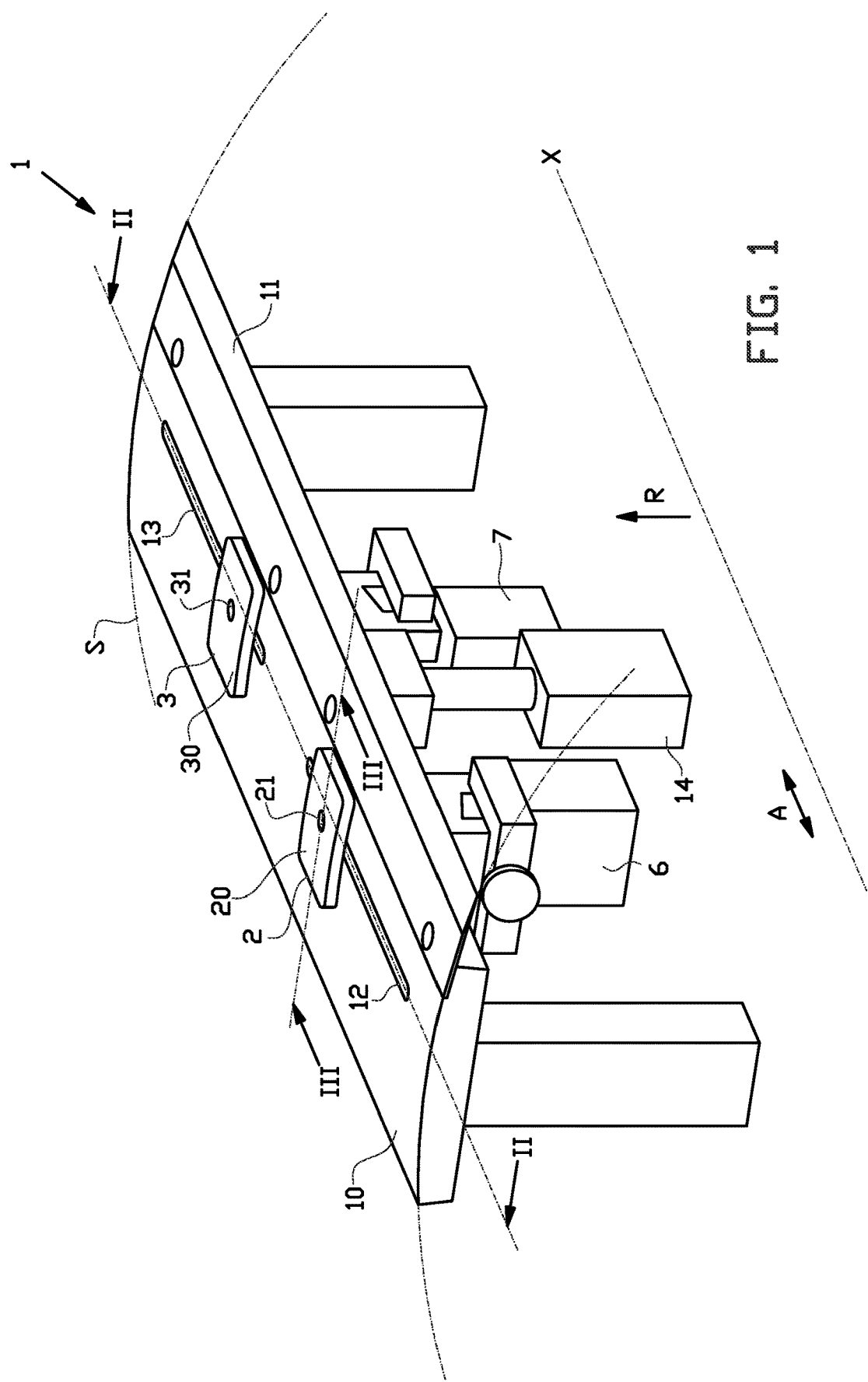
FIG. 1 shows an isometric view of a belt and tread drum according to a first embodiment of the invention with two support members for supporting a tread layer.

FIG. 1 shows a tire building drum or a belt and tread drum 1 according to an exemplary first embodiment of the invention. The belt and tread drum 1 has a circumferential surface S that is rotatable about a drum axis X. In this exemplary embodiment, the circumferential surface S of the belt and tread drum 1 is formed by a plurality of radially movable segments 10, known per se from WO 2015/194940 A1, to vary the drum diameter. In FIG. 1, only one of the plurality of radially movable segments 10 is shown. In this exemplary embodiment, the belt and tread drum 1 is further provided with a cover plate 11 projecting from one side of the segment 10 towards an adjacent segment 10 for spanning gaps between the segments 10 when the plurality of radially movable segments are expanded and maintaining a substantially closed circumferential surface S.

Figure 2:
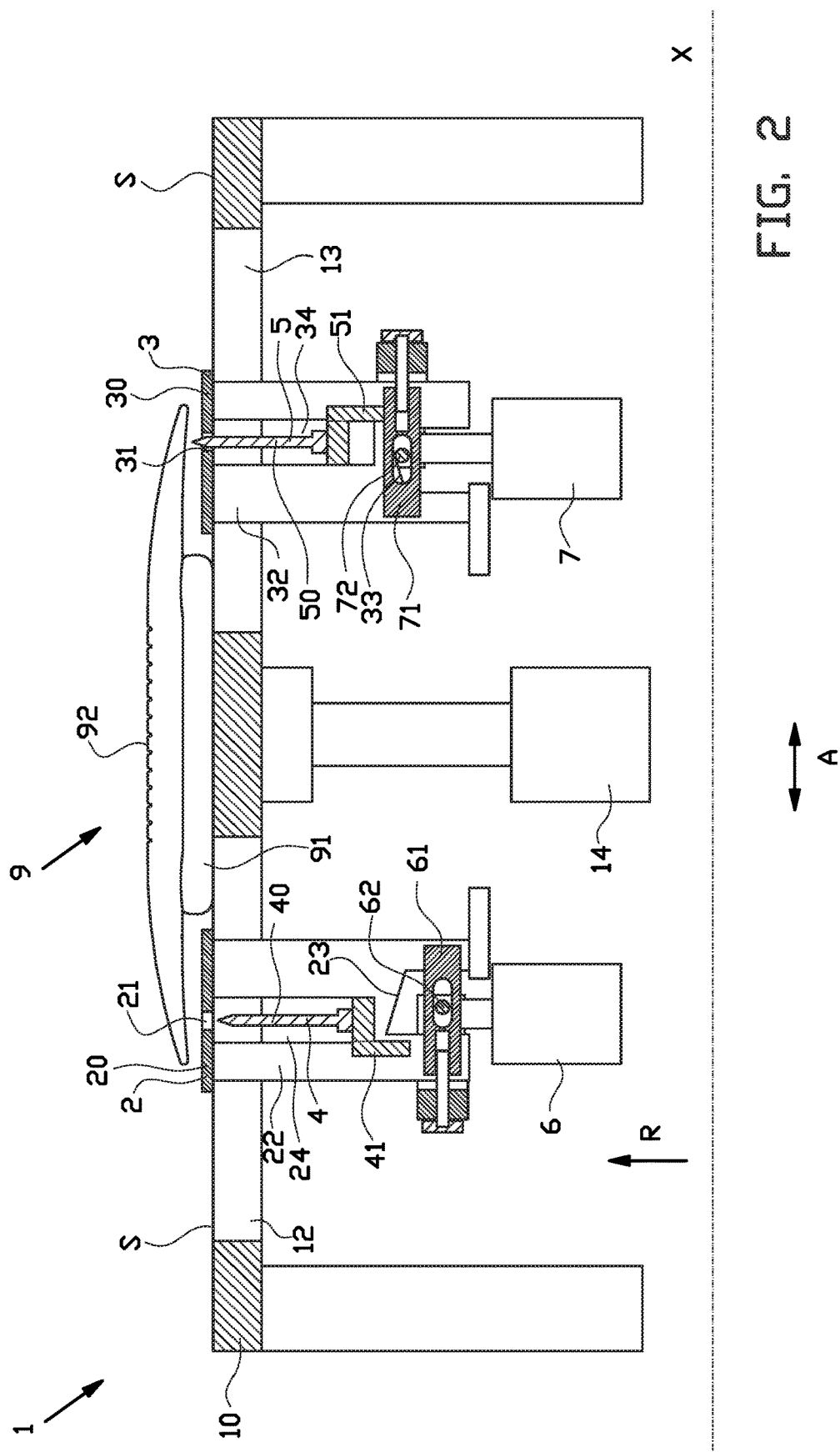
FIG. 2 shows a cross section of the belt and tread drum according to the line II-II in FIG. 1.

The belt and tread drum 1 is used for manufacturing a belt and tread package 9, as shown in FIG. 2. The belt and tread package 9 is processed in a tire manufacturing process to form a tire. The belt and tread package 9 is stitched or spliced on the belt and tread drum 1 to a form a cylindrical or substantially cylindrical tire component. As shown in FIG. 2, the belt and tread package 9 comprises a belt layer 91 and a tread layer 92 that is wider than the belt layer 91 in an axial direction A parallel to the drum axis X. The belt layer 91, considered in a radial direction R perpendicular to the drum axis X, inside the tread layer 92. In other words, the tread layer 92 is arranged radially outside the belt layer 91. Because of the thickness of the belt layer 91, the overhanging side edges of the tread layer 92 are unsupported.

To properly support the overhanging, unsupported side edges of the tread layer 92, the belt and tread drum 1 comprises a first support member 2 and a second support member 3. The support members 2, 3 are spaced apart in an axial direction A parallel to the drum axis X over a distance equal or substantially equal to the width of the belt layer 91. As this width may vary depending on the tire design, the position of the support members 2, 3 in the axial direction A is adjustable, in a manner known per se from WO 2015/023183 A1. The belt and tread drum 1 is provided with a first width adjustment slot 12 and a second width adjustment slot 13 extending in the axial direction A through the segment 10 to allow for said width adjustment.

Figure 4A:
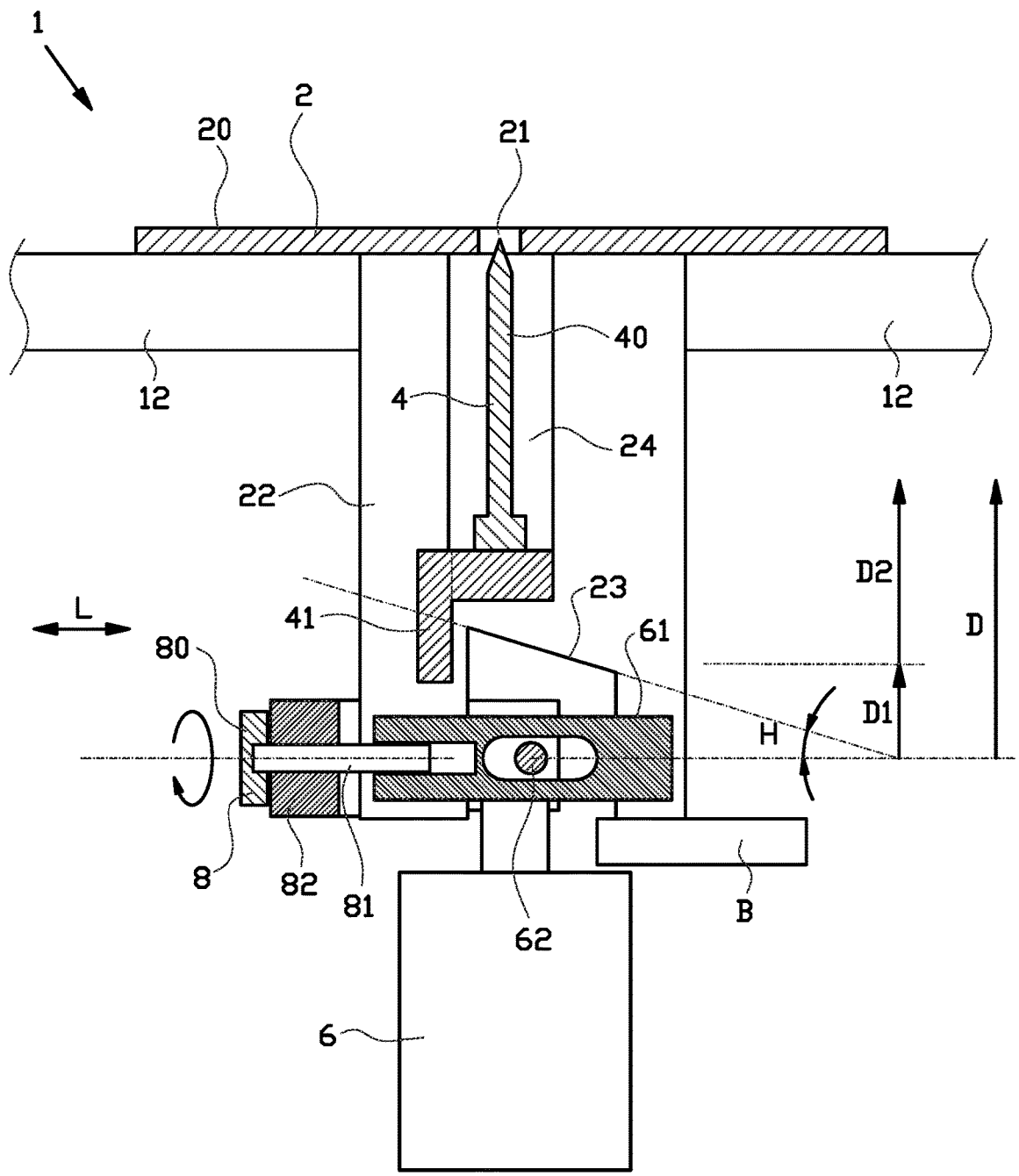
FIGS. 4A-4D show one of the support members of FIG. 2 during steps of its operation.
Figure 4B:
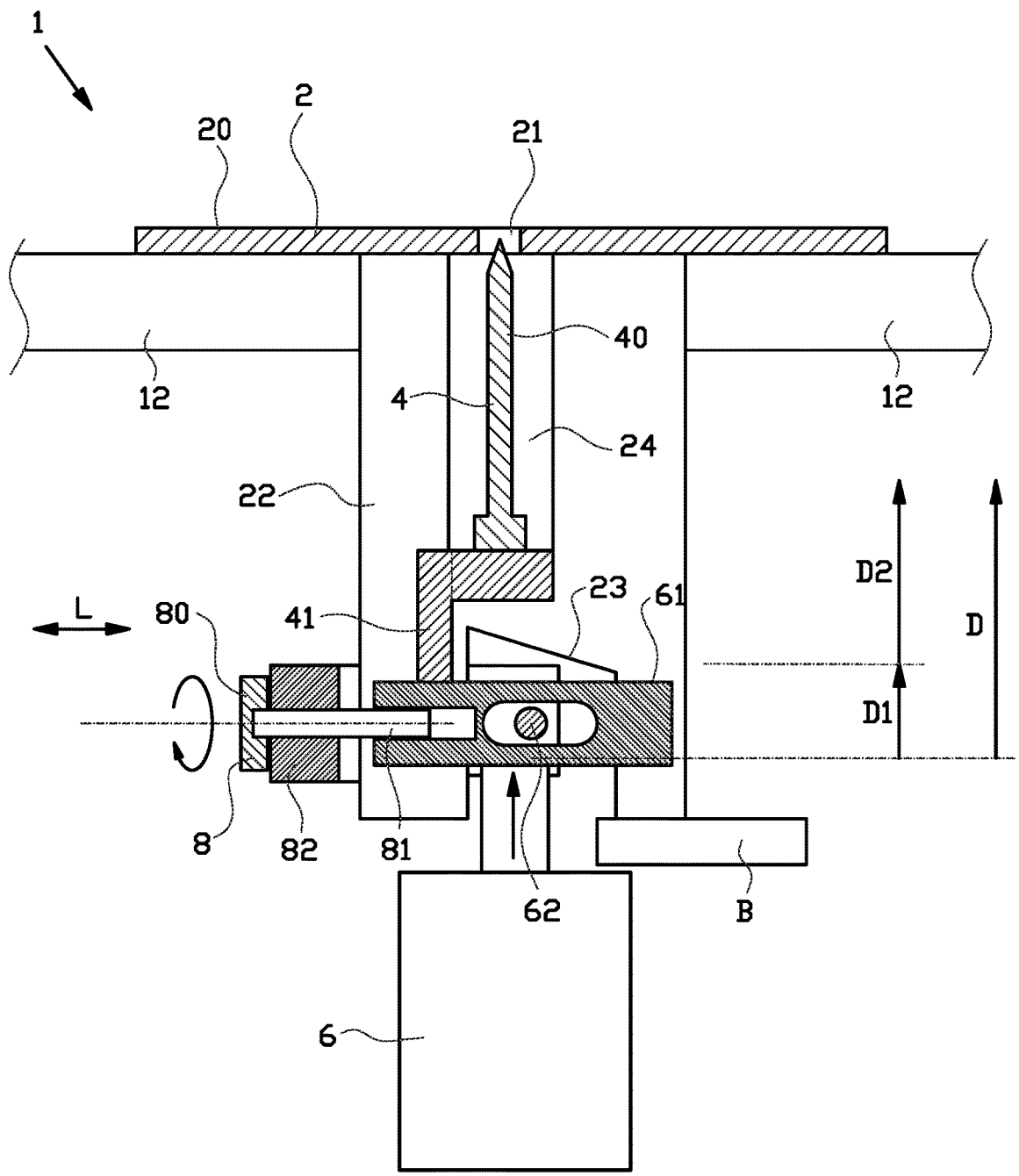
Figure 4C:
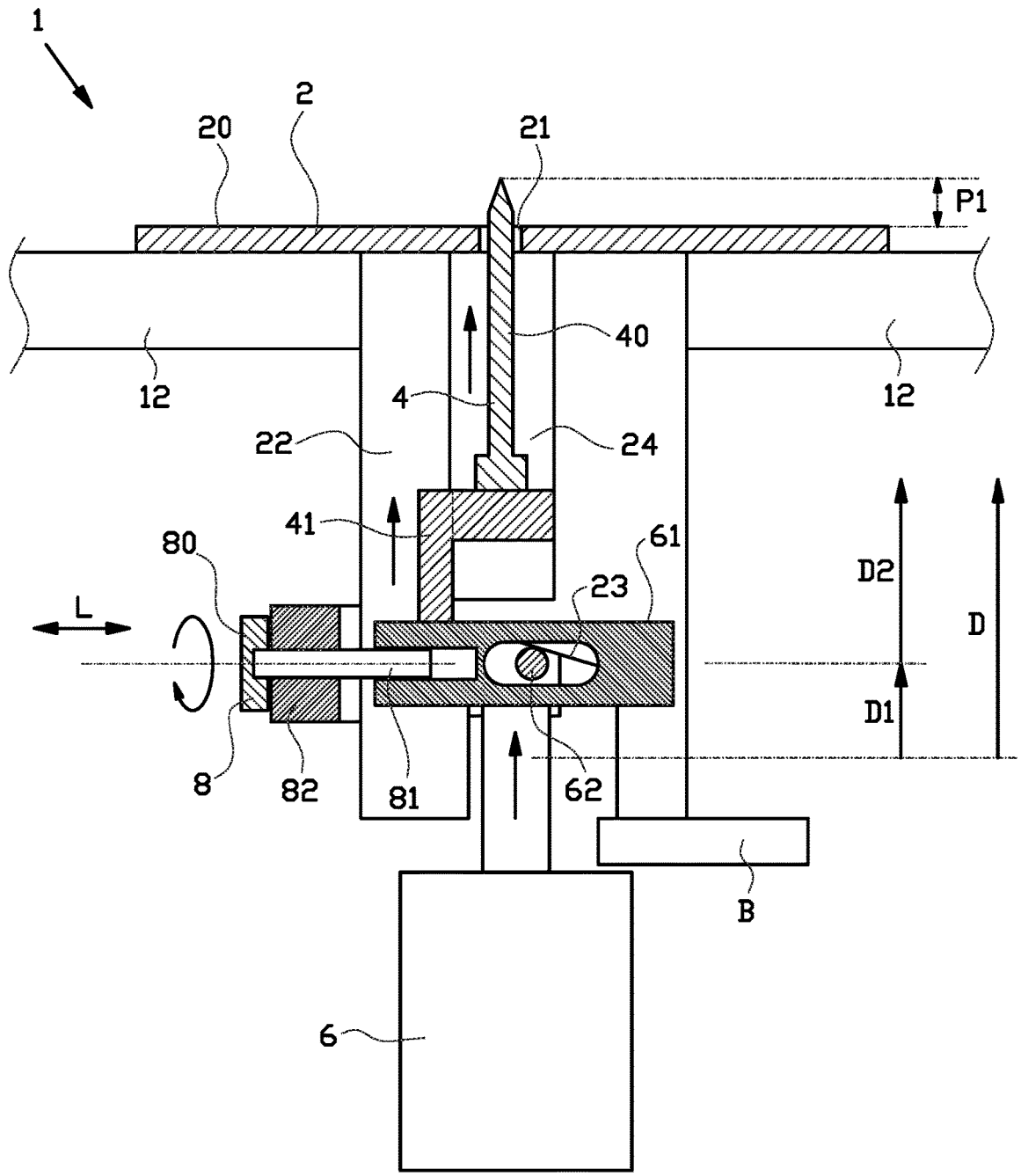
Figure 4D:
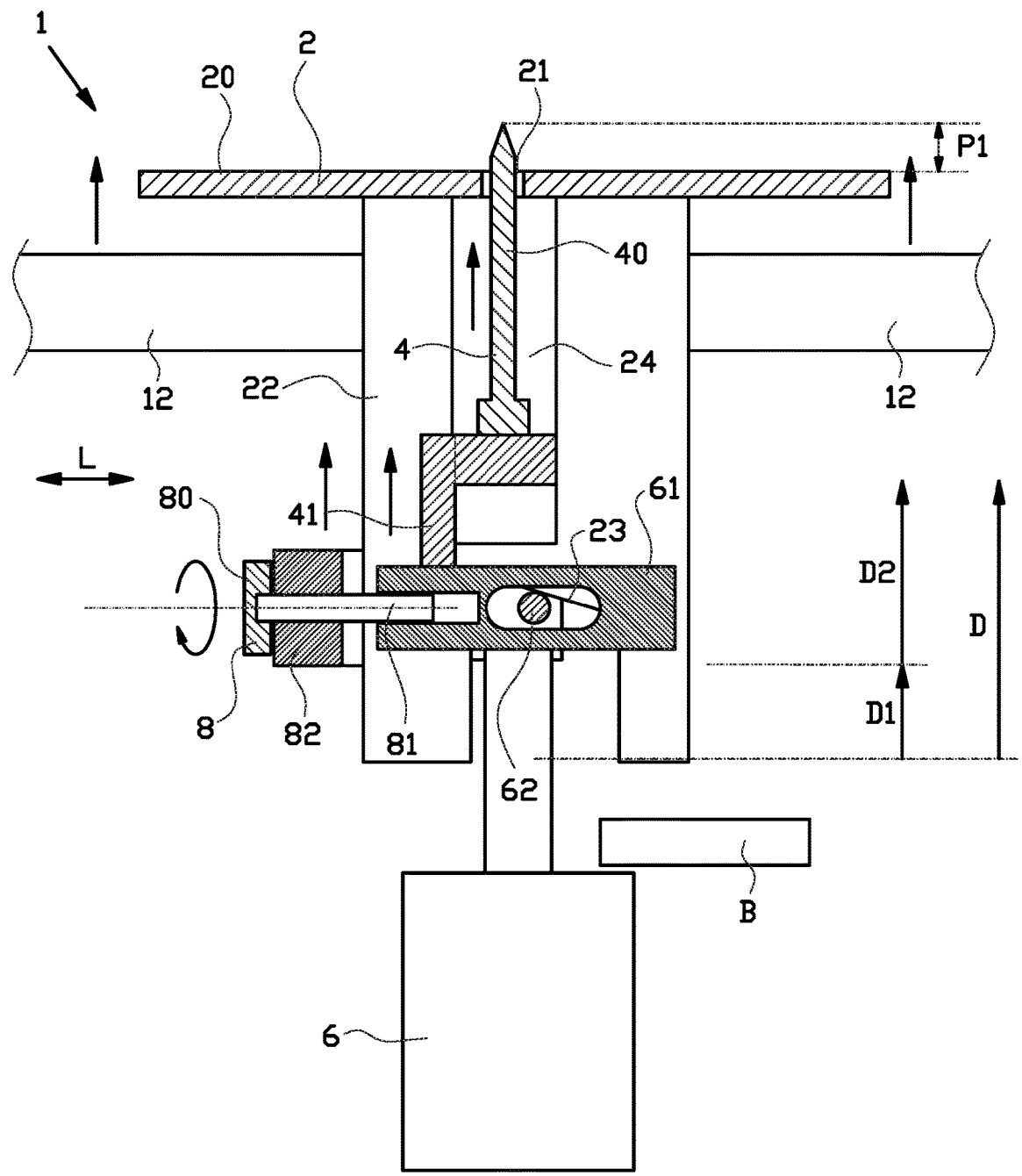

As best seen in FIGS. 1 and 2, each support member 2, 3 comprises a tread support surface 20, 30 which faces away from the drum axis X for supporting the tread layer 92 where said tread layer 92 is wider than the belt layer 91. Each support member 2, 3 is movable in the radial direction R between a retracted position at a first distance from the circumferential surface S in the radial direction R, as shown in FIG. 4A, and a raised position at a second distance from the circumferential surface S in the radial direction R, greater than the first distance, as shown in FIG. 4D. The first distance, as shown in FIG. 4A, may be zero or close to zero. In that case, the support members 2, 3 may lie flat on the segment 10.

Each support member 2, 3 is provided with a hole 21, 31 in its tread support surface 20, 30, for reasons that will be explained shortly hereafter. The first support member 2 and the second support member 3 further comprise a base 22, 32 that supports the support surface 20, 30 relative to the rotation axis X of the belt and tread drum 1.

As shown in FIG. 2, the belt and tread drum 1 further comprises a first retaining element 4 and a second retaining element 5 for retaining the tread layer 92 at the first support member 2 and the second support member 3, respectively. In this exemplary embodiment, the first retaining element 4 and the second retaining element 5 comprise a nail or a needle 40, 50 each. Alternatively, the first retaining element 4 and the second retaining element 5 may comprises a plurality of nails or needles (not shown) or another type of retaining means that is suitable for retaining the tread 92 on the respective support members 4, 5, i.e. by vacuum.

The first retaining element 4 and the second retaining element 5 are movable with respect to the first support member 2 and the second support member 3, respectively. In particular, the retaining elements 4, 5 are movable in the radial direction R or substantially in the radial direction R. The first retaining element 4 and the second retaining element 5 are individually movable. In FIG. 2, the first retaining element 4 is shown in a retracted position, whereas the second retaining element 5 has already been moved outwards in the radial direction R. In particular, the first retaining element 4 and the second retaining element 5 are asynchronously controllable. The retaining elements 4, 5 may be moved over different distances, at different speeds and/or at different times.

The first retaining element 4 and the second retaining element 5 are movable with respect to the first support member 2 and the second support member 3, respectively, through the hole 21, 31 in the tread support surface 20, 30 of the respective support member 2, 3. Alternatively, the retaining elements 4, 5 may be located just outside of the tread support surface 20, 30, i.e. in the width adjustment slots 12, 13.

The belt and tread drum 1 comprises a first drive member 6 for driving the movement of the first support member 2 and the first retaining element 4 in the radial direction R and a second drive member 7 for driving the movement of the second support member 3 and the second retaining element 5 in the radial direction R.

The drive members 6, 7 are linear drives, i.e. pneumatic cylinders. The drive members 6, 7 work in the radial direction R. As shown in FIG. 4A-4E for the first drive member 6 only, the first drive member 6 are movable along a stroke distance D. The second drive member 7 operates in the same way, and will not be discussed in detail hereafter. The first drive member 6 is arranged to move in two parts D1, D2 of the stroke distance D. Along the first part D1 of the stroke distance D, the first drive member 6 is arranged to drive only the first retaining element 4 in the radial direction R. Along the second part D2 of the stroke distance D, the first drive 6 is arranged to drive both the first retaining element 4 and the first support member 2 in the radial direction R.

When looking in more detail at the first drive 6, it can be observed that the first drive member 6 comprises a retaining pusher 61 and a support pusher 62.

In this exemplary embodiment, the retaining pusher 61 is a block or a block-like element that is arranged to abut the first retaining element 4 or a part associated therewith. In other words, the retaining pusher 61 may contact the first retaining element 4 either directly or indirectly, provided that the part that is contacted transmits the movement of the retaining pusher 61 onto the first retaining element 4. In this example, the first retaining element 4 comprises a needle support 41 that is associated with or connected to the needle 40 and that faces the retaining pusher 61. The needle support 41 is movable in the radial direction R through a radial slot 24 in the base 22 of the first support member 2.

The base 22 of the first support member 2 is provided with a contact surface 23 for contacting the support pusher 62. The retaining pusher 61 is arranged to contact the needle support 41 in the radial direction R before the support pusher 62 contacts the first support member 2 or a part 22, 23 associated with said first support member 2. In particular, the support pusher 62 is located in a position in which it contacts the contact surface 23 at a later stage, i.e. in the second part D2 of the stroke distance D as shown in FIG. 4C, than the stage in which the retaining pusher 61 contacts the needle support 41 as shown in FIG. 4B. The skilled person will appreciate that this sequence of contacts can be achieved in many different ways with different types of geometries, contact surfaces and/or cams that all fall within the scope of the present invention.

Moreover, the retaining pusher 61 may be directly and/or rigidly connected to the needle 40 or the needle support 41 instead of contacting it.

Moreover, the sequence may be altered, i.e. by arranging the retaining pusher 61 and the support pusher 62 in such a way that they simultaneously contact the needle support 41 and the first support member 2 and that it is the retaining pusher 61 that contacts the needle support 41 only after the needle support 41 and the first support member 2 have been simultaneously moved over the first part D1 of the stroke distance D. In that case, the first part D1 of the stroke distance D can be used to move the first support member 2 and the first retaining element 4 simultaneously, whereas the second part D2 of the stroke distance D is used to move the first retaining element 4 only. Consequently, the first support member 2 can be moved to support the tips or wings of the tread layer 92 prior to the first retaining element 4 piercing said tread layer 92.

Figure 3:
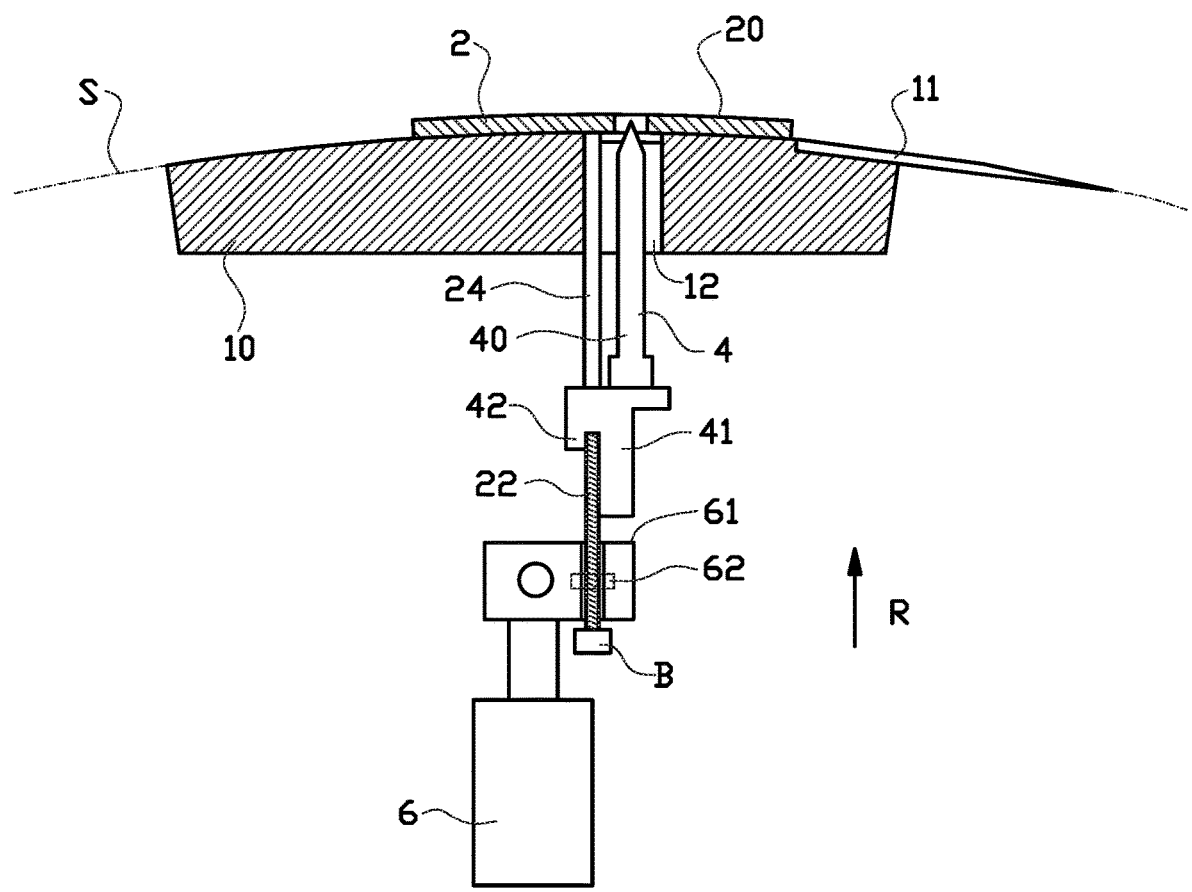
FIG. 3 shows a cross section of the belt and tread drum according to the line in FIG. 1.

As best seen in FIG. 3, in this particular example, the base 22 of the first support member 2 is arranged to extend through a slot in the retaining pusher 61 in the radial direction R. As shown in FIG. 4A, the support pusher 62 that is arranged in the slot at distance below the upper surface of the retaining pusher 61. In other words, the support pusher 62 intersects with the slot in the retaining pusher 61 to contact the contact surface 23 as the support pusher 62 is moved together with the retaining pusher 61 in the radial direction R with respect to the base 22, as shown in FIG. 4C. In this example, the support pusher 62 is formed as a rod, a shaft or a bolt.

As shown in FIG. 3, the needle support 41 may optionally be provided with a hook 42 that can rest on the bottom of the radial slot 24 when the first drive member 6 is retracted in the radial direction R towards the drum axis X to stop the inward motion of the needle support 41 relative to the drum axis X. Moreover, as shown in FIG. 4A, the belt and tread drum 1 may further be provided with a stop B for stopping the inward movement of the base 22 with respect to the drum axis X.

A method of retaining or fixating the tread layer 92 on top of the respective support members 2, 3 will now be elucidated briefly with reference to FIGS. 4A-4E.

FIG. 4A shows the situation in which the first drive member 6 has not yet been extended. The first retaining element 4, in this case the needle 40, does not protrude in the radial direction R through the hole 21 in the tread support surface 20.

FIG. 4B shows the situation when the first drive member 6 has been partially extended to cause the retaining pusher 61 to contact the needle support 41. Further movement of the first drive member 6 in the radial direction R up to the position in FIG. 4C will now only drive the movement of the first retaining element 4 in the radial direction R, as the support pusher 62 has not yet contacted the contact surface 23 of the base 22 of the first support member 2. The sole movement of the first retaining element 4 relative to the stationary first support member 2 causes the first retaining element 4 to project through the hole 21 in the tread support surface 20 over a protrusion distance P1.

In FIG. 4C, the first drive member 6 has travelled the first part D1 of the stroke distance D and the support pusher 62 is now in contact with the contact surface 23 of the base 22 of the first support member 2. The first drive member 6 may now drive the first retaining element 4 and the first support member 2 in unison in the radial direction R during the second part D2 of the stroke distance, as shown in FIG. 4D.

Note that in FIG. 4D the first support member 2 is now lifted from the circumferential surface S of the belt and tread drum 1 in the radial direction D into the raised position. As the retaining element 4 and the first support member 2 are now moved in unison, the relative position of the first retaining element 4 with respect to the first support member 2 remains the same. In other words, the first retaining element 4 is lifted together with the first support member 2 into the raised position thereof.

As shown in FIG. 2, the second drive member 7 also comprises a retaining pusher 71 and a support pusher 72 that operate in essentially the same way as the retaining pusher 61 and the support pusher 62 of the first drive member 6 to drive movement of the second retaining element 5 in the radial direction R, either directly or indirectly, via a needle support 51, through a radial slot 34 in the base 32 of the second support member 3, and the movement of the second support member 3 through contact between the support pusher 72 and the contact surface 33 of the base 32 of said second support member 3.

Figure 5:
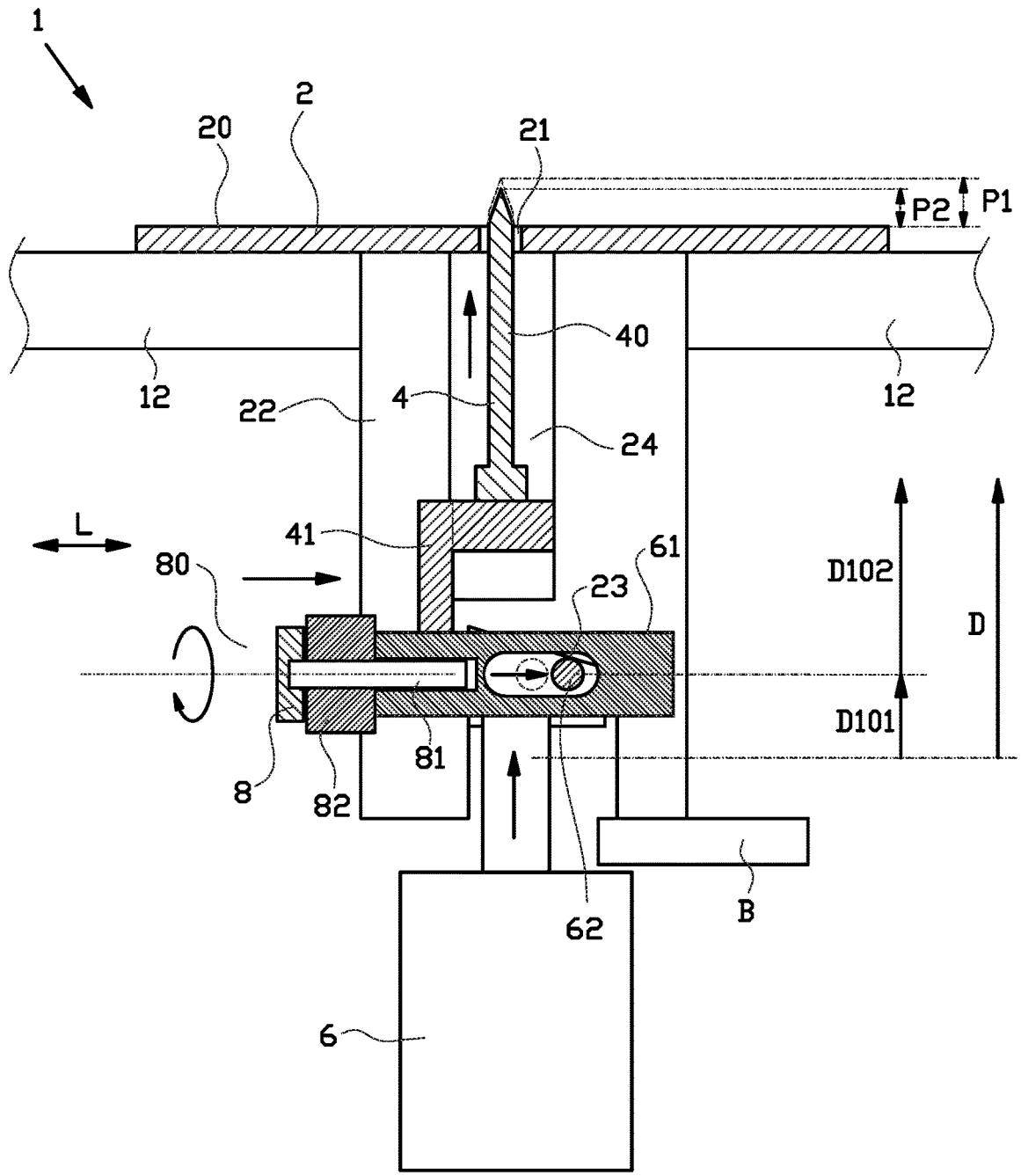
FIG. 5 shows the support member of FIG. 4C after an adjustment of its operation.

As best seen in FIG. 4A, the contact surface 23 according to the exemplary embodiment extends at an oblique angle H to the radial direction R. The belt and tread drum 1 is further provided with an adjustment member 8 for moving the support pusher 62 with respect to said contact surface 23 in an adjustment direction L perpendicular to the radial direction R to adjust the first part D1 and the second part D2 of the stroke distance D. FIG. 5 shows the support pusher 62 in an adjusted position, with the original position of the support pusher 62 shown in dashed or broken lines. In this particular example, the support pusher 62 is moved to the right in FIG. 5 compared to its original position in FIG. 4A. One may appreciate that this puts the support pusher 62 closer to declining edge of the contact surface 23 in the radial direction. Hence, the support pusher 62 in the adjusted position of FIG. 5 will come into contact with the contact surface 23 sooner than in FIG. 4A. As a result, the first part D101 of the stroke distance D becomes shorter. In other words, the part of the stroke distance D in which only the first retaining element 4 is driven by the first drive member 6 is shorter. As soon as the first retaining element 4 and the first support member 2 are both driven by the first drive member 6, there is no relative movement anymore between the first retaining element 4 and the first support member 2. Hence, the first retaining element 4 is stopped at a protrusion distance P2 smaller than the protrusion distance P1 in FIG. 4C.

Similarly, when adjusting the position of the support pusher 62 in the opposite direction, the first part of the stroke distance D will become larger and the first retaining element 4 will be made to protrude further from the first support member 2.

In this exemplary embodiment, the adjustment member 8 is formed by a manually operable knob 80 connected to a threaded shank 81 that passes through an adjustment block 82 and engages with a threaded bore in the retaining pusher 61. The support pusher 62 is coupled or connected to the adjustment block 82 so as to move together with the adjustment block 82 in the adjustment direction L. As the knob 80 is turned, the adjustment block 82 is forced towards or away from the retaining pusher 61, thereby providing a relative movement of the support pusher 62 relative to the retaining pusher 61 in the adjustment direction L.

Figure 6:
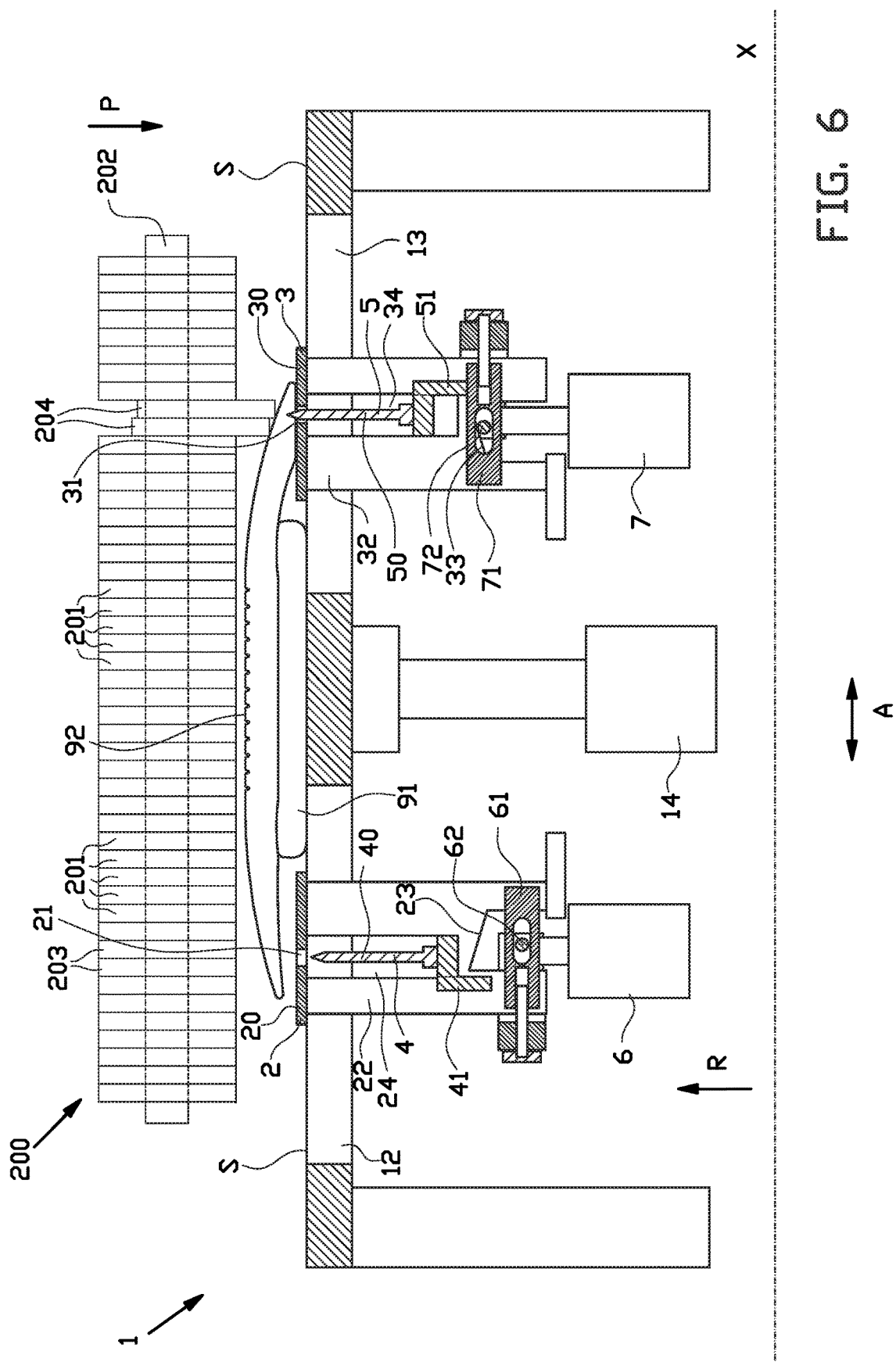
FIG. 6 shows a cross section of an assembly of the belt and tread drum according to FIG. 2 and a pressing member according to the invention.

FIG. 6 shows an assembly of the aforementioned belt and tread drum 1 and a pressing member 200 for applying pressure to the tread layer 92.

The pressing member 200 comprises a plurality of discs 201 and a shaft 202 for supporting said plurality of discs 201 in a side-by-side configuration. Each disc 201 of the plurality of discs 201 is individually movable with respect to the other discs 201 of the plurality of discs 201 in a pressing direction P perpendicular to the shaft 202. The position of the discs 201 relative to the shaft 202 can be controlled pneumatically in a manner known per se, i.e. from WO 2019/182439 A1 by the Applicant, with pistons located in a cavity in each disc 201 (not shown). In this exemplary embodiment, the pressing direction P is also perpendicular or radial to the central axis X of the belt and tread drum 1. The pressing member 200 presses onto the tread layer 92 at the externally facing surface thereof, i.e. at a side of the tread layer 92 opposite to the support members 2, 3. The plurality of discs 201 comprises at least a first group 203 of discs 201 for pressing an area of the tread layer 92 that is supported on the first support member 2 and a second group 204 of discs 201 for pressing an area of the tread layer 92 that is supported on the second support member 3. In this exemplary embodiment, the discs 201 are controlled in pairs, i.e. in groups of two directly adjacent discs 201. Hence, the pressing member 200 may comprise a great number of individually controllable pairs of discs 201. Alternatively, the number of discs 201 in a group may be varied, i.e. by providing a larger group of discs 201 at a centre region than at the support members 2, 3. For reasons of simplicity, only the pairs of discs 201 that form the first group 203 and the second group 204 are shown in FIG. 6. The movement of the discs 201 of the first group 203 is controlled or controllable independently of the movement of the discs 201 of the second group 204. The pressing member 200 is arranged for applying pressure to the tread layer 92 asymmetrically across the width of the tread layer 92. Hence, the pressing member 200 can apply pressure selectively or non-uniformly, depending on where the pressure is required, i.e. only at the support member 2, 3 where one of the retaining elements 4, 5 is retaining the tread layer 92.

The pressing member 200 can effectively cooperate with the aforementioned retaining elements 4, 5 of the belt and tread drum 1 to reliably retain the tread layer 92. In particular, the pressing member 200 can provide counter pressure to the tread layer 92 when the retaining elements 4, 5 engage onto and/or pierce into the tread layer 92 from the other side.

A method for manufacturing a belt and tread package 9 with the use of the aforementioned belt and tread drum 1 and/or the assembly of said belt and tread drum 1 and the pressing member 200 will be elucidated below with reference to FIGS. 1-3, 4A-4D, 5, 6 and 7A-7C.

FIG. 2 shows the belt and tread drum 1 with the belt layer 91 around its circumferential surface S between the first support member 2 and the second support member 3 and with the tread layer 92 applied around the belt layer 91. The ends, tips or wings of the tread layer 92, i.e. the parts of the tread layer 92 where said tread layer 92 is wider than the belt layer 91, project in the axial direction A from the belt layer 91 into a position above the first support member 2 and the second support member 3. The second retaining element 5 is driven to pierce into the tread layer 92 to retain the end, tip or wing of said tread layer 92 at the second support member 3, whereas the first retaining element 4 is still down leaving the other end, tip or wing of the tread layer 92 unretained. The first retaining element 4 can be driven upwards in the same way, as shown in FIGS. 4A-4D. The retaining elements 4, 5 can be controlled to retain the tread layer 92 simultaneously or asynchronously, depending on the requirements for splicing.

The support members 2, 3 may be driven upwards after or prior to the upward movement of the retaining elements 4, 5, depending on the configuration of the drive mechanism.

FIG. 6 shows an example of a situation in which the aforementioned pressing member 200 is used to apply pressure to the tread layer 92 asymmetrically, unevenly and/or non-uniformly across the width of the tread layer 92. In particular, the discs 201 of the second group 204 are pressed onto the tread layer 92 simultaneously with the second retaining element 5 retaining the tread layer 92. In contrast, the discs 201 of the first group 203 are held in a standby position or upper position and do not actively press down onto the tread layer 92 at the first support member 2. In this example, all the discs 201 except for the discs 201 of the second group 204 are maintained in an upper position in which said discs 201 are spaced apart and/or kept clear of the tread layer 92. Alternatively, the discs 201 of the first group may rest on the tread layer 92 without applying more pressure than the pressure as a result of the mass of the discs 201, or at least applying less pressure than the pressure exerted by the discs 201 of the second group 204. The pressing member 200 may be controlled to alternate the application of pressure between the two groups 203, 204 or to apply pressure simultaneously with both groups 203, 204 during a subsequent stage of the method.

FIGS. 7A, 7B and 7C show optional steps of the method, in which the ends, tips or wings T1, T2 of the tread layer 92 are retained while the tread layer 92 is pulled back slightly, i.e. in a direction opposite to its feeding direction. The tread layer 92 can be fed onto the belt and tread drum 1 by a servicer or applicator 300, i.e. a conveyor belt or the like. By pulling back on the tread layer 92, the tread layer 92 can be deformed with respect to the part(s) T1, T2 of said tread layer 92 that is/are retained, as shown in FIG. 7B. Hence, the shape of the tread layer 92, and in particular the leading end LE thereof, can be optimized for splicing with the trailing end TE, as shown in FIG. 7C.

Figure 8A:
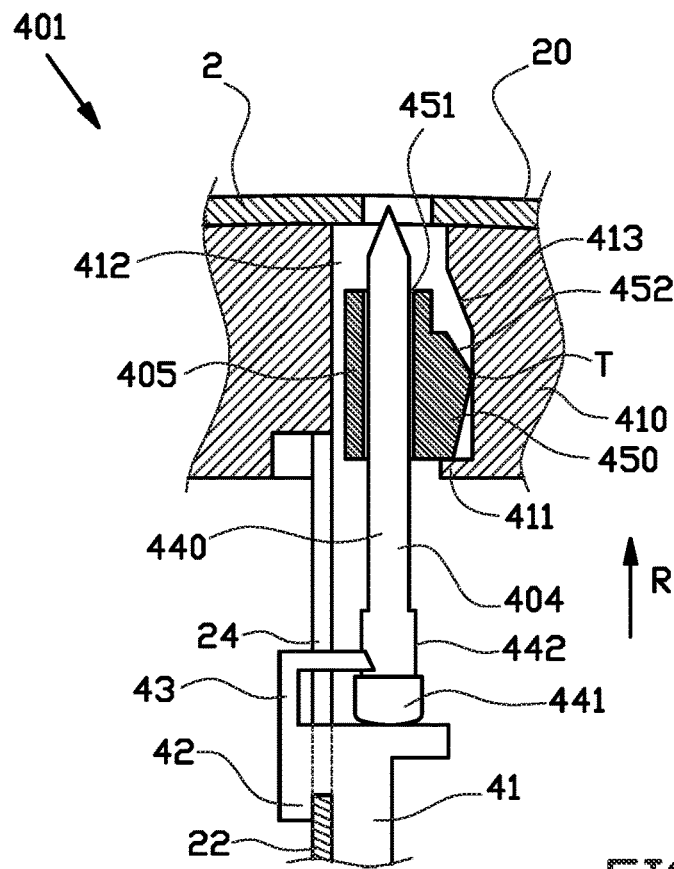
FIGS. 8A and 8B show cross sections of an alternative belt and tread drum according to a second embodiment of the invention.
Figure 8B:
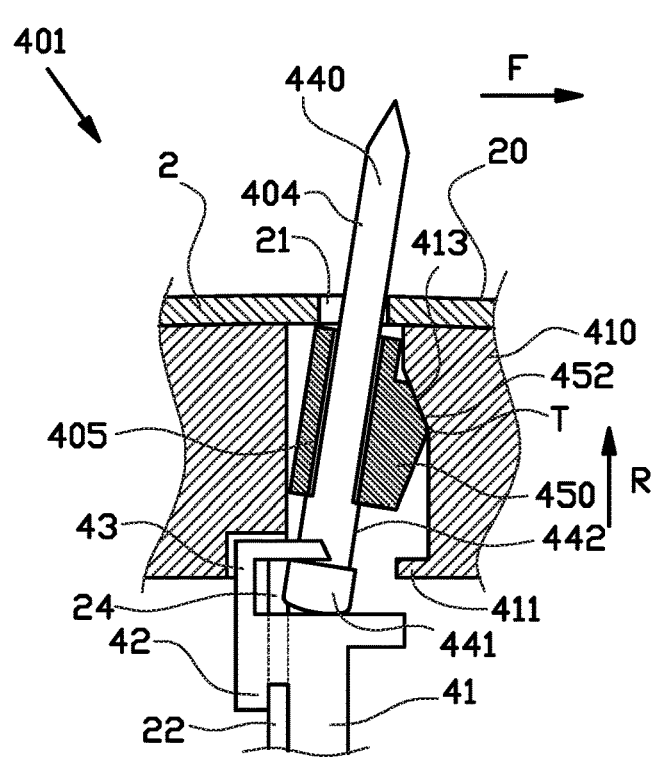

FIGS. 8A and 8B show an alternative tire building drum or belt and tread drum 401 according to a second exemplary embodiment of the invention. The alternative belt and tread drum 401 differs from the previously discussed belt and tread drum 1 in that its first retaining element 404 is adapted to tilt at or near the end of the stroke distance, i.e. when the needle 440 is already partially protruding out of the first support member 2 through the hole 21 in said first support member 2 in the radial direction R. In particular, the needle 440 is arranged to tilt in or towards a feeding direction F of the tread layer 92. This increases the grip of the needle 440 on the material of the tread layer 92 and may prevent accidental release of the tread layer 92 from said needle 440 in a direction opposite to said feeding direction F.

To facilitate the tilting, the alternative belt and tread drum 401 is provided with a tilt guide 405 that interacts with the first retaining element 404, the segment 410 and/or the first support member 2 to cause a displacement of said first retaining element 404 relative to said first support member 2 about a tilt axis T. In this exemplary embodiment, the tilt axis T is parallel or substantially parallel to the drum axis X and/or transverse or perpendicular to the radial direction R. The tilt guide 405 comprises a guide body 450 and a through hole 451 in said guide body 450 for receiving the needle 440 there through. The guide body 450 is further provided with a tilt cam 451. The needle 440 is provided with a needle base 441 that is slightly rounded so as to allow for pivoting and/or sliding of the needle base 441 over the corresponding needle support 41. The needle 440 further comprises a step 442 above the needle base 441. The step 442 is slightly wider in diameter than the through hole 451 in the guide body 450. The step 442 is arranged to come into contact with and displace the tilt guide 405 as soon as the needle 440 reaches a certain height protruding above the first support member 2. The tilt guide 405 is then displaced together with the needle 440 in the radial direction R.

As is further shown in FIGS. 8A and 8B, the needle support 41 is further provided with a needle retainer 43 for retaining the needle 440 with respect to said needle support 41. In particular, the needle retainer 43 is arranged to grip the needle base 441 upon a radial inward movement of the needle support 41. Hence, the needle 440 can be retracted more reliably.

The alternative belt and tread drum 401 is provided with a segment 410 that is adapted to interact with the tilt guide 405 to cause the tilting of the needle 440. In particular, the segment 410 is provided with a slot 412, similar to the previously discussed first width adjustment slot, and a guide support 411 for supporting the tilt guide 405 inside the slot 412, in the manner as shown in FIG. 8A. The segment 410 is further provided with a tilt surface 413 inside the slot 412 extending obliquely to the radial direction R and/or parallel or substantially parallel to the tilt axis T. As shown in FIG. 8B, the tilt guide 405 is arranged to come into contact with the tilt surface 413 when said tilt guide 405 is being displaced together with the needle 440 in the radial direction R. The interaction between the tilt cam 452 of the tilt guide 405 and the tilt surface 413 of the segment 410 causes a tilt of the tilt guide 405, and the needle 440 received therein, about the tilt axis T.

It will be clear to one skilled in the art that the previously second retaining element 5 may be adapted to tilt in the same manner.

FIGS. 9A-9E show an alternative drum for building a tire or a belt and tread drum 501 according to a third exemplary embodiment of the invention. The alternative belt and tread drum 501 differs from the previously discussed belt and tread drum 1 in that it comprises an alternative first drive having an alternative retaining pusher or pneumatic actuator 506. Said retaining pusher or pneumatic actuator 506 is arranged to displace the first retaining element 4 with respect to the first support member 2.

The retaining pusher or pneumatic actuator 506 comprises a cylinder 560 and a piston 561 that is movable back and forth within said cylinder 560. Preferably, the outer perimeter of said piston 561 contacts the inner perimeter of the cylinder 560 in an airtight or substantially airtight manner. The retaining pusher or pneumatic actuator 506 further comprises a first flow channel 564 at a first end of the cylinder 560 and a second flow channel 565 at a second end of the cylinder 560 opposite to the first end. Said first flow channel 564 and said second flow channel 565 are in fluid communication with the cylinder 560 at the first end and the second end of said cylinder 560, respectively.

In the embodiment as shown in FIGS. 9A-9E, the retaining element 4 is directly coupled to the piston 561. Alternatively, the piston 561 may for example be coupled to the needle support 41 for supporting a tilting needle 440 according to previously discussed embodiment of retaining element 404.

The piston 561 is movable back and forth between a first position at the first end of the cylinder 560 and a second position at the second end of the cylinder 560. In this particular embodiment, the first position corresponds to the radially outward position as is shown in FIGS. 9C and 9D. The second position corresponds to the radially inward position as is shown in FIG. 9A.

The piston 561 is movable by applying a pressure difference between the first flow channel 564 and the second flow channel 565. In particular, at said first flow channel 564 a working fluid is provided at first pressure. Said working fluid is provided at a second pressure at the second flow channel 565. As is shown in FIG. 9E, the piston 561 is movable towards the second position by applying a first pressure at the first flow channel 564 which is greater than a second pressure applied at the second flow channel 565. Accordingly, as is shown in FIG. 9B, the piston 561 is movable towards the first position by applying a second pressure at the second flow channel 565 which is greater than a first pressure at the first flow channel 564. The working fluid is preferably supplied by a fluid source which is arranged externally with respect to the belt and tread drum 501.

Figure 9A:
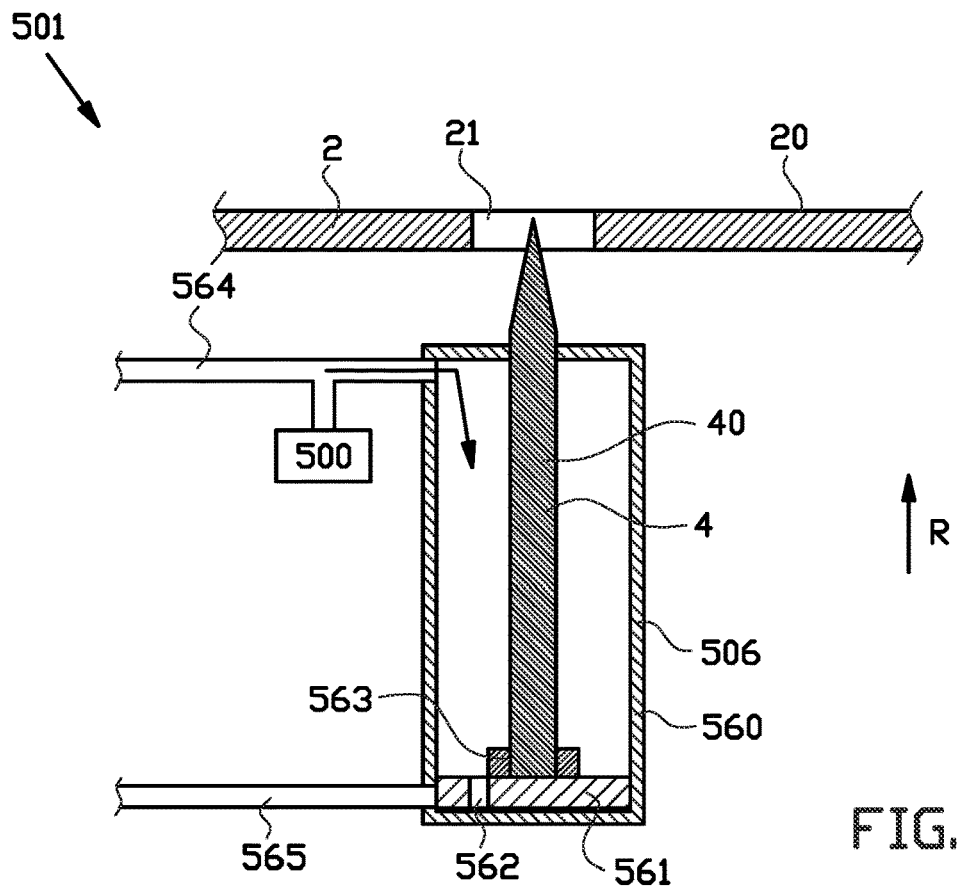
FIGS. 9A-9E show cross sections of a further alternative belt and tread drum according to a third embodiment of the invention.
Figure 9B:
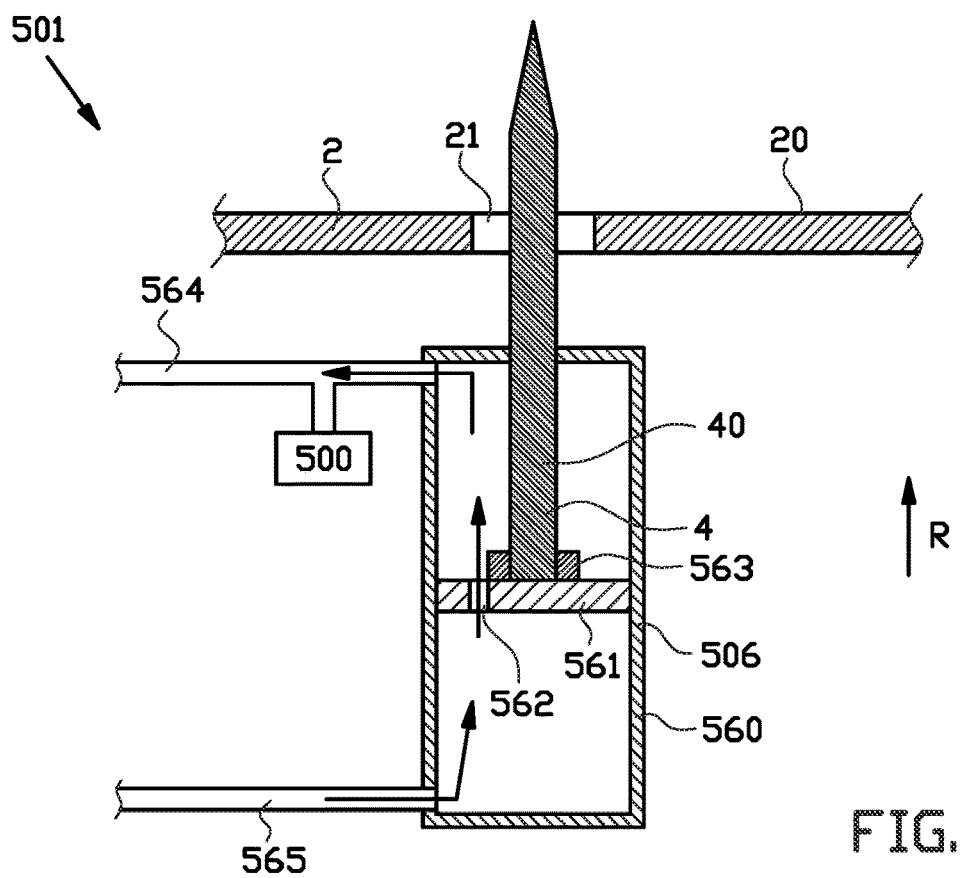
Figure 9C:
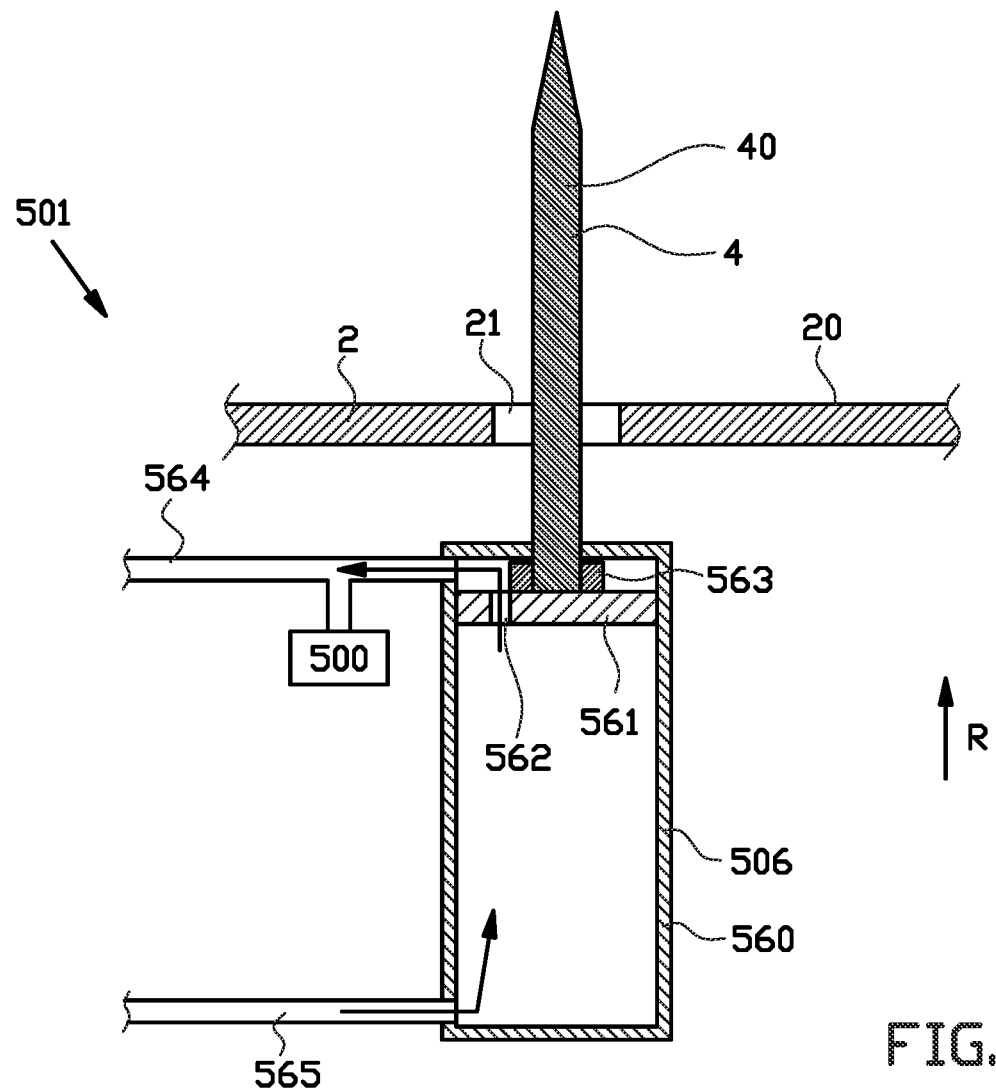
Figure 9D:
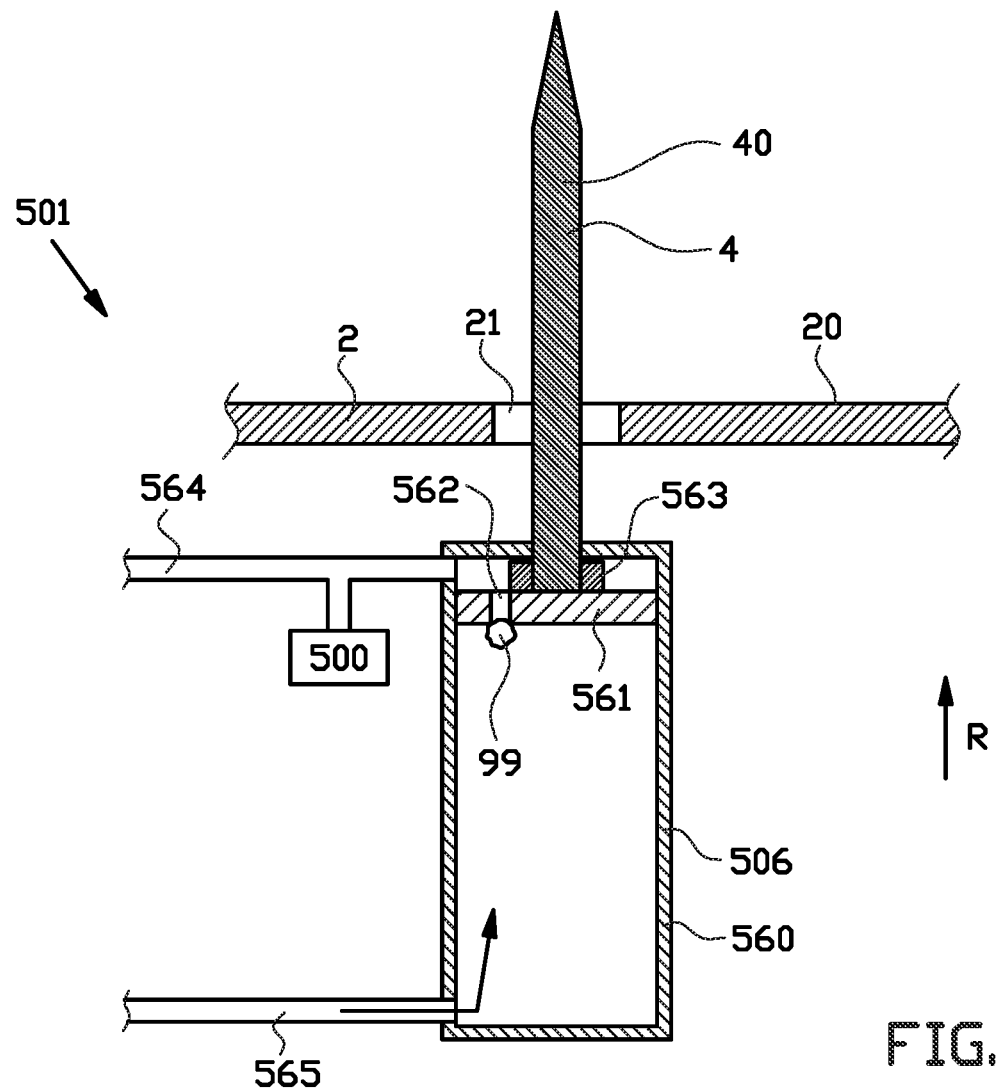
Figure 9E:
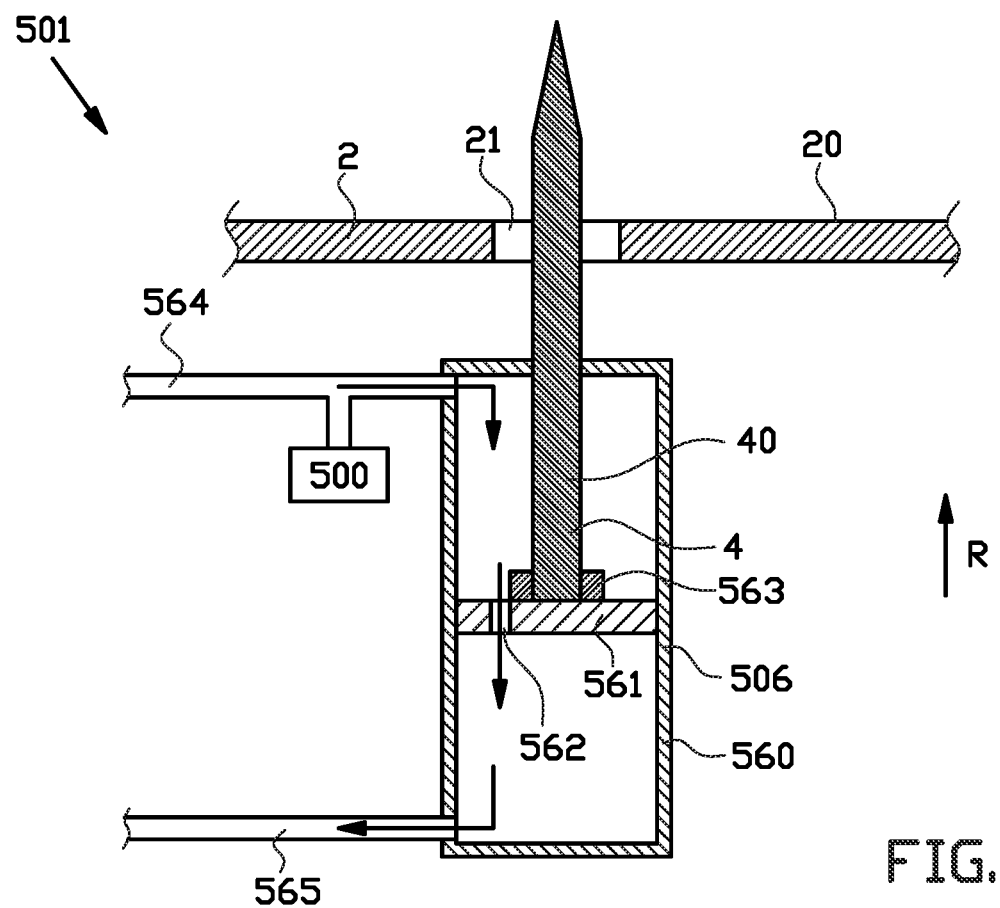

As is further shown in FIGS. 9A-9E, the piston 561 is provided with a piston aperture 562. Said piston aperture 562 is a through hole extending through the piston 561. The piston aperture 562 allows the working fluid to flow between the first flow channel 564 and the second flow channel 565 when the piston 561 is in the first position or in between the first position and the second position. As is shown in FIG. 9A, the retaining pusher or pneumatic actuator 506 is arranged to block a flow between the first flow channel 564 and the second flow channel 565 when the piston 561 is in the second position.

The retaining pusher or pneumatic actuator 506 further comprises a spacer 563 for, when the piston 561 is in the first position, spacing apart the piston 561 and the first end of the cylinder 560. As is best shown in FIG. 9D, the spacer 563 is arranged to create a gap between the piston 561 and the cylinder 560, such that the first flow channel 564 and the piston aperture 563 are in fluid communication.

In this particular embodiment, the spacer 563 is arranged on the piston 561. Alternatively, the spacer may be arranged at the first end of the cylinder 560. In the embodiment as shown, the spacer 563 is a spacer ring. However, the spacer 563 may be dimensioned in any form which allows a fluid flow between the first flow channel 564 and the piston aperture 562.

The belt and tread drum 501 further comprises a control unit 500. Said control unit comprises a flow meter which is in fluid communication with the first flow channel 564 for measuring a flow in said first flow channel 564. Alternatively or additionally, the control unit may comprise a flow meter in fluid communication with the second flow channel 565 for measuring a flow in said second flow channel 565. The control unit 500 may further be operationally connected to a working fluid source to control the fluid supply to the respective first flow channel 564 and second flow channel 565. Additionally, or alternatively, the control unit may be operationally connected to a rotational drive of the belt and tread drum 501 to control a rotation of said belt and tread drum 501.

A first function of the control unit is detecting or measuring the flow when the piston 561 is moved towards the second position, i.e. when the first pressure is greater than the second pressure, as is shown in FIGS. 9A and 9E. When a flow is detected by the flow meter, for example in the situation of FIG. 9E, the control unit 500 is arranged to generate a signal indicative of the piston 561 not being in the second position. Accordingly, the control unit 500 is arranged to block a rotation of the belt and tread drum 501. When no flow is detected or a measured flow is below a predetermined threshold, for example in the situation of FIG. 9A, the control unit 500 is arranged to generate a signal indicative of the piston 561 being in the second position. In this case, the control unit 500 is arranged to allow a rotation of the belt and tread drum 501. Preferably, the control unit 500 is arranged to initiate the rotation of the belt and tread drum 501 when a presence of the piston 561 in the second position is detected.

A second function of the control unit is detecting or measuring the flow when the piston 561 is moved towards the first position, i.e. when the second pressure is greater than the first pressure, as is shown in FIGS. 9B, 9C and 9D. When a flow is detected by the flow meter, for example in the situation of FIGS. 9B and 9C, the control unit 500 is arranged to generate a signal indicative normal operation of the retaining pusher or pneumatic actuator 506. Accordingly, no further action is required and the operation of the belt and tread drum 501 may continue.

As is shown in FIG. 9D, when the piston aperture 562 is contaminated by debris or any other contamination 99, the flow through said piston aperture 562 may be obstructed, reduced or even blocked. Consequently, no flow is detected or a reduced flow is measured by the flow meter. The control unit 500 is arranged to generate a signal which is indicative of a contamination of the piston aperture 562 when no flow is detected by the flow meter or when the measured flow is below a predetermined threshold. Preferably, the control unit 500 is arranged to stop any process on the belt and tread drum 501 and to send a warning message to an operator.

Figure 10:
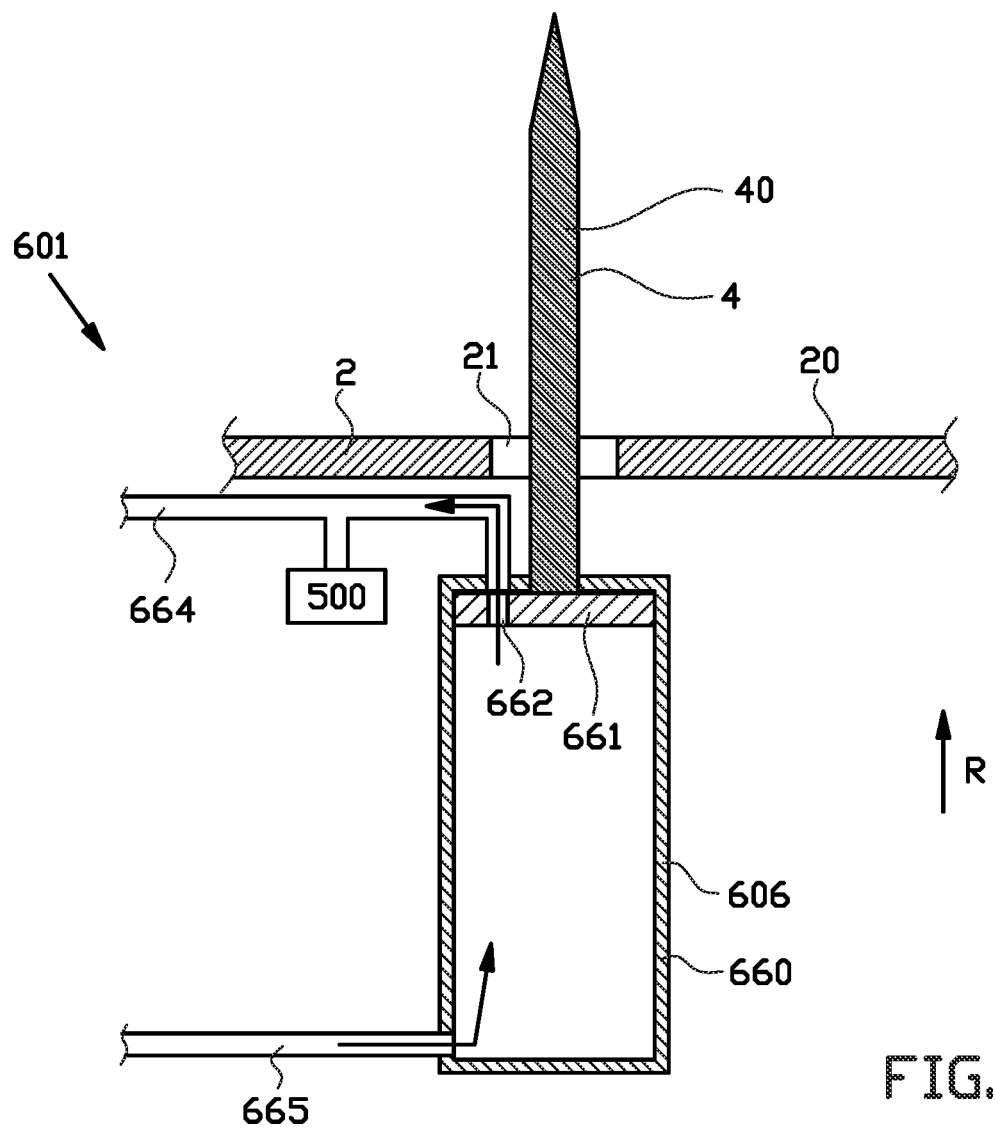
FIG. 10 shows a cross section of a further alternative belt and tread drum according to a third embodiment of the invention.

FIG. 10 shows an alternative drum for building a tire or a belt and tread drum 601 according to a fourth exemplary embodiment of the invention. The belt and tread drum 601 differs from the previously discussed belt and tread drum 501 in that it comprises a further alternative retaining pusher or pneumatic actuator 606. Said retaining pusher or pneumatic actuator 606 differs from the previously described retaining pusher or pneumatic actuator 506 in that it does not comprise the spacer 563. Instead, the retaining pusher or pneumatic actuator 606 is dimensioned such that the first flow channel 664 is in line with the piston aperture 662 when the piston 661 is in the first position. In other words, when the piston 661 is in the first position, the first channel 664 debouches in the piston aperture 662. Hence, the piston aperture 662 forms an extension of the first flow channel 664.

Figure 11:
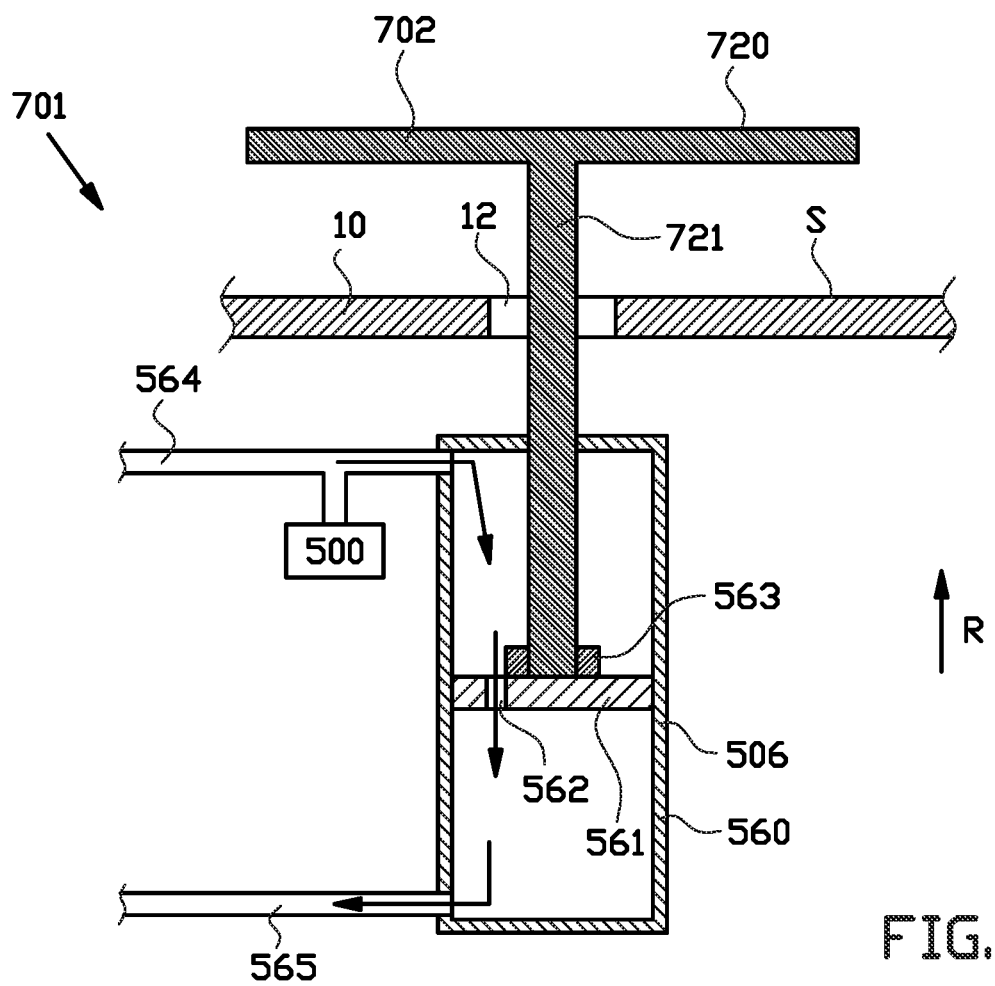
FIG. 11 shows a cross section of a belt and tread drum according to an embodiment of a second aspect of the invention.

The above described embodiments of a pneumatic actuator 506, 606 are not limited to the use as a retaining pusher. For example, in FIG. 11, an alternative belt and tread drum 701 is shown, having a first support member 702. Said first support member 702 differs from the previously described first support member 2 in that is does not comprises the retaining means 4. Hence, in this particular embodiment, the pneumatic actuator 506 functions as a support pusher. The first support member 702 comprises a stem 721 which is connected to the piston 561 for moving the support member 702 together with the piston 561.

Many variations will be apparent to one skilled in the art that would yet be encompassed by the scope of the present invention. For example, both the retaining pusher and the support pusher may comprise a pneumatic actuator 506, 606 as described above.

In general, the above described aspect of the present invention relates to a drum for tire building, such as a belt and tread drum 501, 601, 701, a transfer drum or a transfer wheel, comprising the pneumatic actuator 506, 606 as described above for controlling a radial movement of an actuated drum part 4, 702 with respect to a reference surface 20, S of said drum. Preferably, said drum 501, 601, 701 further comprises the control unit 500 as described above for determining the presence of the piston 561, 661 in the second position and/or for detecting a contamination of the piston aperture 562, 662. It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 belt and tread drum
10 segment
11 cover plate
12 first width adjustment slot
13 second width adjustment slot
14 segment drive
2 first support member
20 tread support surface
21 hole
22 base
23 contact surface
24 radial slot
3 second support member
30 tread support surface
31 hole
32 base
33 contact surface
34 radial slot
4 first retaining element
40 needle
41 needle support
42 hook
43 needle retainer
5 second retaining element
50 needle
51 needle support
6 first drive member
61 retaining pusher
62 support pusher
7 second drive member
71 retaining pusher
72 support pusher
8 adjustment member
80 knob
81 threaded shank
82 adjustment block
9 belt and tread package
91 belt layer
92 tread layer
99 contamination
200 pressing device
201 disc
202 shaft
203 first group
204 second group
300 servicer
401 alternative belt and tread drum
410 segment
411 guide support
412 first width adjustment slot
413 tilt surface
404 alternative first retaining element
440 needle
441 needle base 442 step
405 tilt guide
450 guide body
451 through hole
452 tilt cam
500 control unit
501 alternative belt and tread drum
506 alternative retaining pusher or pneumatic actuator
561 piston
562 piston aperture
563 distance element
564 first flow channel
565 second flow channel
601 alternative belt and tread drum
606 alternative retaining pusher or pneumatic actuator
661 piston
662 piston aperture
664 first flow channel
665 second flow channel
701 alternative belt and tread drum
702 alternative first support member
720 alternative tread support surface
721 stem
A axial direction
B stop
D stroke distance
D1 first part of stroke distance
D2 second part of stroke distance
F feeding direction
L adjustment direction
LE leading end
P pressing direction
P1 first protruding distance
P2 second protruding distance
R radial direction
S circumferential surface
T tilt axis
TE trailing end
T1 first tip
T2 second tip
X drum axis

The invention claimed is:

1. A belt and tread drum for manufacturing a belt and tread package, wherein the belt and tread package comprises a belt layer and a tread layer that is wider than the belt layer, wherein the belt and tread drum has a circumferential surface that is rotatable about a drum axis, wherein the belt and tread drum comprises a first support member, wherein the first support member comprises a tread support surface which faces away from the drum axis for at least partially supporting the tread layer where said tread layer is wider than the belt layer, wherein the first support member is positionable in a raised position outside the circumferential surface in a radial direction, wherein the belt and tread drum further comprises a first retaining element at the first support member for engaging onto the tread layer to retain the tread layer in position on the tread support surface, wherein the first support member is movable in a radial direction perpendicular to the drum axis between a retracted position at a first distance from the circumferential surface in the radial direction and the raised position at a second distance from the circumferential surface in the radial direction, wherein the second distance is greater than the first distance, wherein the belt and tread drum comprises a first drive member for driving the movement of the first support member and the first retaining element in the radial direction, wherein the first drive member is a linear drive that is movable along a stroke distance, wherein the first drive member, along a first part of the stroke distance, is arranged to drive only the first retaining element in the radial direction and wherein the first drive member, along a second part of the stroke distance, is arranged to drive both the first retaining element and the first support member in the radial direction.

2. The belt and tread drum according to claim 1, wherein the first retaining element is a part of the belt and tread drum that is functionally different from the tread support surface in that the tread support surface merely supports the tread layer and in that the first retaining element retains the tread layer in position on said tread support surface.

3. The belt and tread drum according to claim 1, wherein the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the second support member is positionable in a raised position outside the circumferential surface in the radial direction, wherein the belt and tread drum further comprises a second retaining element for retaining the tread layer at the second support member.

4. The belt and tread drum according to claim 3, wherein the first retaining element and the second retaining element are individually movable.

5. The belt and tread drum according to claim 3, wherein the first retaining element and the second retaining element are asynchronously controllable.

6. The belt and tread drum according to claim 1, wherein the first retaining element comprises one or more needles.

7. The belt and tread drum according to claim 1, wherein the first support member is provided with a hole in the tread support surface of the first support member, wherein the first retaining element is movable with respect to the first support member through the hole in the tread support surface of the first support member.

8. The belt and tread drum according to claim 1, wherein the first retaining element is movable with respect to the first support member in a direction transverse to the drum axis.

9. The belt and tread drum according to claim 1, wherein the first drive member comprises a retaining pusher and a support pusher, wherein the retaining pusher is arranged to push the first retaining element or a part associated with said first retaining element in the radial direction before the support pusher pushes the first support member or a part associated with said first support member.

10. The belt and tread drum according to claim 9, wherein the first support member comprises a base with a contact surface extending at an oblique angle to the radial direction for contacting the support pusher, wherein the support pusher is movable with respect to said contact surface in an adjustment direction perpendicular to the radial direction to adjust the first part and the second part of the stroke distance.

11. The belt and tread drum according to claim 1, wherein the belt and tread drum comprises a plurality of radially movable segments that together form the circumferential surface, wherein the first support member and the first retaining element are provided at one radially movable segment of the plurality of radially movable segments.

12. The belt and tread drum according to claim 11, wherein the first support member is movable in the radial direction between a retracted position and a raised position relative to said one radially movable segment.

13. The belt and tread drum according to claim 6, wherein the one or more needles of the first retaining element are tiltable about a tilt axis transverse to the radial direction when said one or more needles partially protrude outside the first support member in the radial direction.

14. An assembly of a belt and tread drum according to claim 1 and a pressing member for applying pressure to the tread layer.

15. An assembly according to claim 14, wherein the pressing member is arranged for applying pressure to the tread layer asymmetrically across the width of the tread layer.

16. An assembly according to claim 14, wherein the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the pressing member comprises a plurality of discs and a shaft for supporting said plurality of discs in a side-by-side configuration, wherein each disc of the plurality of discs is individually movable with respect to the other discs of the plurality of discs in a pressing direction perpendicular to the shaft, wherein plurality of discs comprises a first group of discs for pressing an area of the tread layer that is supported on the first support member and a second group of discs for pressing an area of the tread layer that is supported on the second support member, wherein the movement of the discs of the first group is controllable independently of the movement of the discs of the second group.

17. A method for manufacturing a belt and tread package with the use of the belt and tread drum according to claim 1, wherein the method comprises the steps of:
  applying the belt layer around the circumferential surface of the belt and tread drum;
  applying the tread layer around the belt layer while supporting the tread layer with the first support member where said tread layer is wider than the belt layer; and
  retaining the tread layer at the first support member with the first retaining element.

18. The method according to claim 17, wherein the belt and tread drum comprises a second support member which is spaced apart from the first support member in an axial direction parallel to the drum axis, wherein the second support member comprises a tread support surface which faces away from the drum axis for at least partially supporting the tread layer where said tread layer is wider than the belt layer, wherein the second support member is positionable in a raised position outside the circumferential surface in the radial direction, wherein the belt and tread drum further comprises a second retaining element for retaining the tread layer at the second support member, wherein the method comprises the steps of:
  applying the belt layer around the circumferential surface of the belt and tread drum between the first support member and the second support member;
  applying the tread layer around the belt layer while supporting the tread layer with the second support member where said tread layer is wider than the belt layer; and
  retaining the tread layer at the second support member with the second retaining element.

19. The method according to claim 18, wherein the first retaining element and the second retaining element are controlled to retain the tread layer simultaneously.

20. The method according to claim 18, wherein the first retaining element and the second retaining element are controlled to retain the tread layer asynchronously.

21. The method according to claim 17, wherein the first retaining element comprises one or more needles, wherein the retaining of the tread layer by the first retaining element involves piercing the one or more needles into the tread layer.

22. The method according to claim 21, wherein the one or more needles of the first retaining element are tilted about a tilt axis transverse to the radial direction when said one or more needles partially protrude outside the first support member in the radial direction.

23. The method according to claim 17, wherein the method further comprises the steps of moving only the first retaining element in the radial direction along a first part of a stroke distance and moving both the first retaining element and the first support member in the radial direction along a second part of the stroke distance.

24. The method according to claim 23, wherein the method further comprises the step of adjusting the first part and the second part of the stroke distance.

25. The method according to claim 17, wherein the belt and tread drum comprises a plurality of radially movable segments that together form the circumferential surface, wherein the first support member and the first retaining element are provided at one radially movable segment of the plurality of radially movable segments, wherein the method further comprises the step of moving the first support member in the radial direction between a retracted position and a raised position relative to said one radially movable segment.

26. The method according to claim 17, wherein the method further comprises the steps of supplying the tread layer to the belt and tread drum with a servicer and pulling back on the tread layer with the servicer when the tread layer is retained by the first retaining element.

27. The method according to claim 18, wherein the method further comprises the steps of supplying the tread layer to the belt and tread drum with a servicer and pulling back on the tread layer when the tread layer is retained by both the first retaining element and the second retaining element.

28. The method according to claim 18, wherein the tread layer has a leading end, wherein the first retaining element and the second retaining element retain a first tip and a second tip, respectively, of the tread layer at the leading end.

29. The method according to claim 18, wherein the tread layer has a leading end, wherein the first retaining element and the second retaining element retain the tread layer at the leading end while applying said tread layer around the belt layer.

30. The method according to claim 17, wherein the method further comprises the step of using a pressing member to apply pressure to the tread layer.

31. The method according to claim 30, wherein the pressing member applies pressure to the tread layer asymmetrically across the width of the tread layer.

32. The method according to claim 18, wherein the method further comprises the step of using a pressing member to apply pressure to the tread layer, wherein the pressing member comprises a plurality of discs and a shaft for supporting said plurality of discs in a side-by-side configuration, wherein each disc of the plurality of discs is individually movable with respect to the other discs of the plurality of discs in a pressing direction perpendicular to the shaft, wherein the method further comprises the step of pressing an area of the tread layer that is supported on the first support member with a first group of discs of the plurality of discs and pressing an area of the tread layer that is supported on the second support member with a second group of discs of the plurality of discs by controlling the movement of the discs of the first group independently of the movement of the discs of the second group.

33. The method according to claim 32, wherein the discs of the first group are pressed onto the tread layer when the first retaining element retains the tread layer.

34. The method according to claim 32, wherein the discs of the second group are pressed onto the tread layer when the second retaining element retains the tread layer.

* * * * *